(12) United States Patent
Shechter et al.

(10) Patent No.: US 11,299,412 B2
(45) Date of Patent: Apr. 12, 2022

(54) MODULE, REACTOR, SYSTEM AND METHOD FOR TREATING WATER

(71) Applicant: FLUENCE WATER PRODUCTS AND INNOVATION LTD., Caesarea (IL)

(72) Inventors: Ronen-Itzhak Shechter, Kiryat Tivon (IL); Eytan Baruch LEvy, Rosh Ha-ain (IL); Lior Eshed, Haifa (IL); Yaron Bar-Tal, Ganey Tikvah (IL); Tomer Spector, Petach Tikva (IL); Noam Mordechai Siegel, Tel-Aviv (IL)

(73) Assignee: FLUENCE WATER PRODUCTS AND INNOVATION LTD., Caesarea (IL)

( * ) Notice: Subject to any disclaimer, the term of this patent is extended or adjusted under 35 U.S.C. 154(b) by 0 days.

(21) Appl. No.: 16/563,329

(22) Filed: Sep. 6, 2019

(65) Prior Publication Data
US 2019/0389754 A1 Dec. 26, 2019

Related U.S. Application Data

(63) Continuation of application No. 15/509,565, filed as application No. PCT/IL2015/050910 on Sep. 8, 2015, now Pat. No. 10,457,581.
(Continued)

(51) Int. Cl.
*C02F 3/20* (2006.01)
*C02F 3/10* (2006.01)
(Continued)

(52) U.S. Cl.
CPC .............. *C02F 3/208* (2013.01); *C02F 3/102* (2013.01); *C02F 3/1278* (2013.01); *C02F 3/305* (2013.01);
(Continued)

(58) Field of Classification Search
CPC .. C02F 3/102; C02F 3/208; C02F 3/20; C02F 3/1268; C02F 3/1273; C02F 3/1278
(Continued)

(56) References Cited

U.S. PATENT DOCUMENTS

| | | | |
|---|---|---|---|
| 4,692,318 A * | 9/1987 | Tolpin | B01D 53/08 423/239.1 |
| 4,775,471 A | 10/1988 | Nagai et al. | |

(Continued)

FOREIGN PATENT DOCUMENTS

| | | |
|---|---|---|
| CA | 2458566 A1 | 8/2004 |
| CA | 2732262 A1 | 2/2010 |

(Continued)

OTHER PUBLICATIONS

Azema et al., "Colloids and Surfaces A: Physicochemical and Engineering Aspects," vol. 204, Issues 1-3, May 23, 2002, pp. 131-140. (English-language Abstract.).

(Continued)

*Primary Examiner* — Claire A Norris
(74) *Attorney, Agent, or Firm* — Oliff PLC

(57) ABSTRACT

The present disclosure provides a water treatment module, a bioreactor comprising one or more of such modules and a receptive water treatment system. Also provided herein is a method making use of the above module, bioreactor and system. The water treatment module comprises (i) at least one elongated gas enclosure comprising a gas inlet and two vertical walls, at least one vertical wall comprising a water-impermeable and gas-permeable membrane having a water-facing side and a gas-facing side, the two vertical walls separating between water external to the enclosure and gas within the enclosure, the gas enclosure being in a rolled or folded configuration to thereby define a convoluted horizontal path and one or more water-treatment spaces formed (Continued)

between opposite water facing sides of the enclosure; and (ii) a diffuser arrangement comprising gas diffusers configured for introducing a stream of gas into the one or more water treatment spaces.

2 Claims, 24 Drawing Sheets

Related U.S. Application Data

(60) Provisional application No. 62/047,267, filed on Sep. 8, 2014.

(51) Int. Cl.
*C02F 3/30* (2006.01)
*C02F 3/12* (2006.01)
*C02F 101/16* (2006.01)

(52) U.S. Cl.
CPC .... *C02F 2101/16* (2013.01); *C02F 2101/163* (2013.01); *C02F 2203/00* (2013.01); *C02F 2209/003* (2013.01); *C02F 2301/026* (2013.01); *C02F 2303/20* (2013.01); *Y02W 10/10* (2015.05)

(58) Field of Classification Search
USPC .... 210/150, 321.74, 321.83, 321.85, 321.76, 210/493.4, 494.1
See application file for complete search history.

(56) References Cited

U.S. PATENT DOCUMENTS

| | | | |
|---|---|---|---|
| 5,116,506 A | 5/1992 | Williamson et al. | |
| 5,482,859 A | 1/1996 | Biller et al. | |
| 5,486,475 A | 1/1996 | Kramer et al. | |
| 5,585,004 A | 12/1996 | Livingston | |
| 6,168,648 B1 | 1/2001 | Ootani et al. | |
| 6,558,549 B2 | 5/2003 | Cote et al. | |
| 6,616,843 B1 * | 9/2003 | Behmann | C02F 3/1273 210/605 |
| 6,645,374 B2 | 11/2003 | Cote et al. | |
| 6,908,547 B2 | 6/2005 | Cote et al. | |
| 7,140,495 B2 | 11/2006 | Hester et al. | |
| 7,279,215 B2 | 10/2007 | Hester et al. | |
| 7,294,259 B2 | 11/2007 | Cote et al. | |
| 7,300,571 B2 | 11/2007 | Cote et al. | |
| 7,303,676 B2 * | 12/2007 | Husain | B01D 69/084 210/615 |
| 7,303,677 B2 | 12/2007 | Cote et al. | |
| 7,591,950 B2 | 9/2009 | Zha et al. | |
| 7,927,493 B2 | 4/2011 | Daigger | |
| 8,465,644 B2 | 6/2013 | Kitamura et al. | |
| 8,528,745 B2 | 9/2013 | Husain et al. | |
| 2002/0020666 A1 * | 2/2002 | Cote | C02F 3/308 210/605 |
| 2003/0104192 A1 * | 6/2003 | Hester | B32B 3/26 428/304.4 |
| 2004/0079692 A1 | 4/2004 | Cote et al. | |
| 2005/0123727 A1 | 6/2005 | Hester et al. | |
| 2006/0021936 A1 | 2/2006 | Husain et al. | |
| 2006/0096918 A1 * | 5/2006 | Semmens | B01D 63/026 210/615 |
| 2007/0199904 A1 | 8/2007 | Thompson | |
| 2009/0017514 A1 | 1/2009 | Datta et al. | |
| 2013/0146518 A1 | 6/2013 | Suk | |
| 2013/0256219 A1 * | 10/2013 | Oldfield | C02F 3/103 210/608 |
| 2018/0265383 A1 | 9/2018 | Shechter et al. | |
| 2018/0282190 A1 | 10/2018 | Shechter et al. | |

FOREIGN PATENT DOCUMENTS

| | | |
|---|---|---|
| CA | 2629910 C | 4/2013 |
| CN | 201016099 Y | 2/2008 |
| EP | 0197024 A1 | 10/1986 |
| JP | H05-64795 A | 3/1993 |
| JP | H06-023065 A | 2/1994 |
| JP | H07-013427 U | 3/1995 |
| JP | 2001-145896 A | 5/2001 |
| JP | 2003-211185 A | 7/2003 |
| JP | 2007-095471 A | 4/2007 |
| JP | 2008-221070 A | 9/2008 |
| KR | 2012-0048621 A | 5/2012 |
| WO | 01/66474 A2 | 9/2001 |
| WO | 03/051782 A1 | 6/2003 |
| WO | 04/071973 A1 | 8/2004 |
| WO | 2008/130885 A2 | 10/2008 |
| WO | 2009/081118 A1 | 7/2009 |
| WO | 2011/073977 A1 | 6/2011 |
| WO | 2013/039626 A2 | 3/2013 |
| WO | 2013/059216 A1 | 4/2013 |
| WO | 2016/038606 A1 | 3/2016 |
| WO | 2016/108227 A1 | 7/2016 |
| WO | 2018/055623 A1 | 3/2018 |

OTHER PUBLICATIONS

Feb. 16, 2016 Search Report issued in International Patent Application No. PCT/IL2015/050910.
Xiaowen He et al., "New Technologies and Applications of Water Pollution Treatment," University of Science and Technology of China Press, pp. 200-201, Mar. 2013.
Zhuannian Liu et al., "Environmental Protection Equipment Fundamentals," China University of Mining and Technology Press, p. 105, Jan. 2013.

* cited by examiner

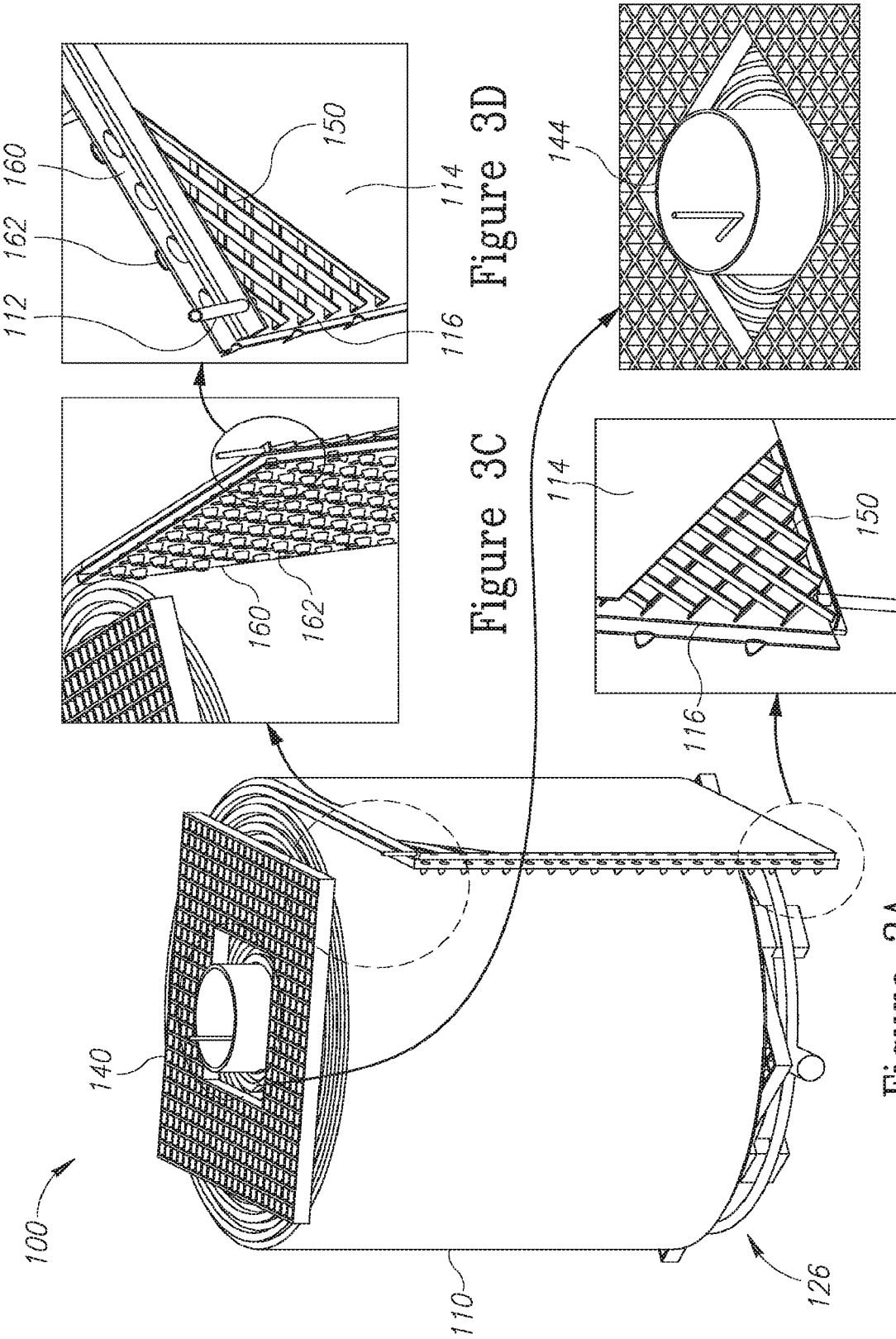

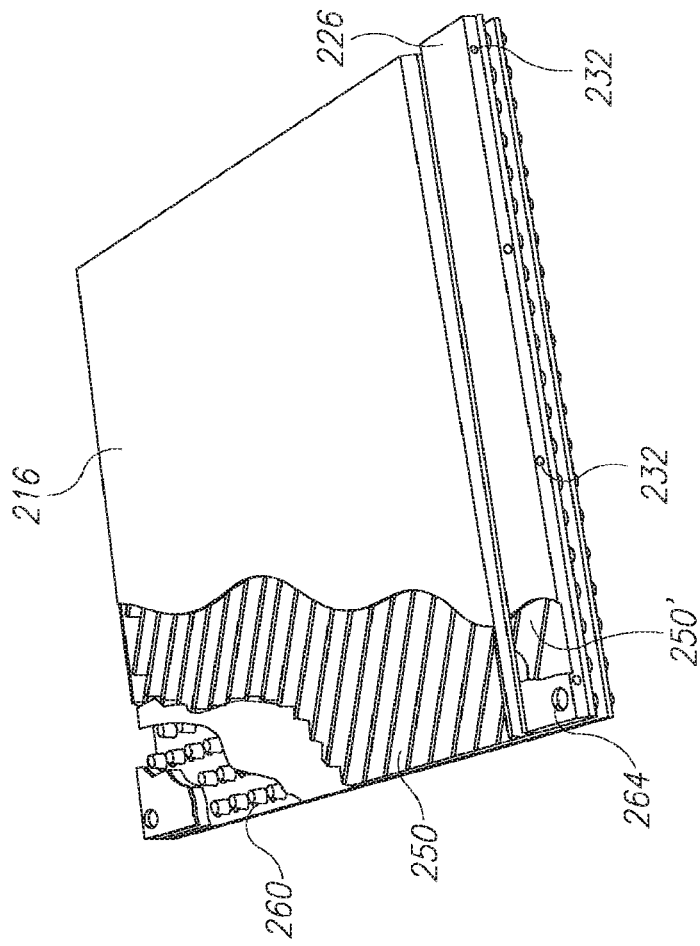
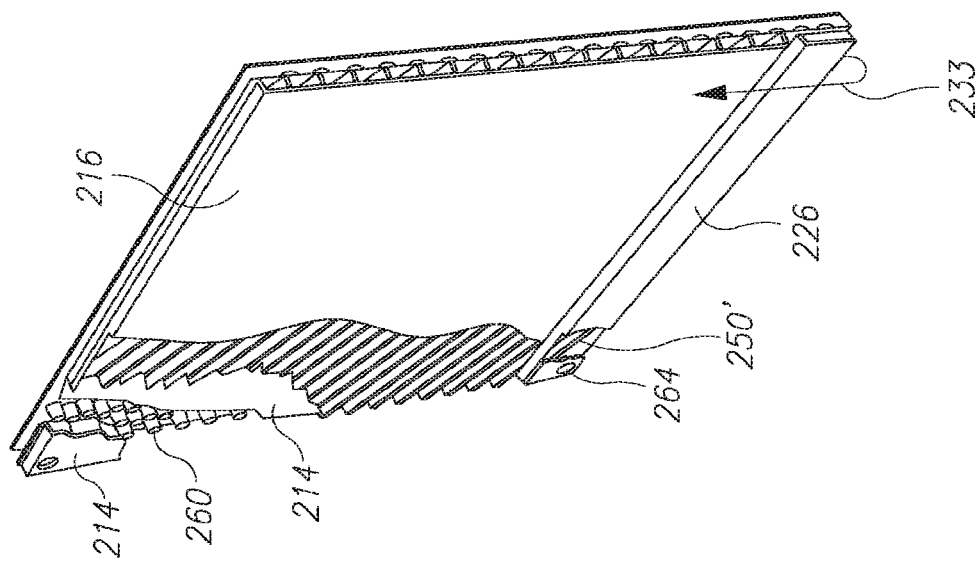

MODULE, REACTOR, SYSTEM AND METHOD FOR TREATING WATER

The present application is a continuation application of U.S. application Ser. No. 15/509,565 filed Mar. 8, 2017, which in turn is a U.S. national stage of PCT/IL2015/050910 filed Sep. 8, 2015, which claims the benefit of U.S. Provisional Application No. 62/047,267 filed Sep. 8, 2014. The entire disclosure of each of these prior applications is incorporated herein by reference.

TECHNOLOGICAL FIELD

The disclosure relates to water treatment technologies and in particular to waste water treatment.

BACKGROUND ART

References considered to be relevant as background to the presently disclosed subject matter are listed below:
  International Patent Application Publication No. WO 2011/073977
  International Patent Application Publication No. WO 2008/130885
  International Patent Application Publication No. WO 2013/059216
  International Patent Application Publication No. WO 2013/039626
Acknowledgement of the above references herein is not to be inferred as meaning that these are in any way relevant to the patentability of the presently disclosed subject matter.

BACKGROUND

Water treatment reactor systems can vary depending on the type of treatment required. Some reactors are considered bioreactors as they typically utilize microorganisms for biologically degrading organic contaminants present in the water to be treated. Some reactors employ aeration means for, inter alia, agitating water to be treated.

WO 2011/073977 describes a system for treating wastewater including at least one water-treatment pathway having at least one wastewater inlet, at least one oxygen-permeable, water-impermeable wall, separating an interior of the pathway from outside air, and at least one treated wastewater outlet and arranged for at least aerobic treatment of the wastewater as it flows from the at least one wastewater inlet to the at least one treated wastewater outlet, at least one wastewater supply conduit, supplying the wastewater to the at least one wastewater inlet of the water-treatment pathway and at least one treated wastewater conduit, supplying treated wastewater from the at least one treated wastewater outlet of the at least one water-treatment pathway.

WO 2008/130885 describes a membrane supported biofilm apparatus having a plurality of hollow fiber gas permeable membranes in a tank containing water to be treated. The membranes have an outside diameter of about 200 microns or less and occupy between 0.5 percent and 4 percent of the tank volume. A biofilm supported on the membranes occupies between about 40 percent and 80 percent of the volume of water to be treated in a reactor. The membranes are oriented generally vertically and a spreader may be located near the bottom of the apparatus to disperse the membranes. Wastewater treatment processes are also described.

WO 2013/059216 describes a module for use in a membrane biofilm reactor and systems comprising such modules. The module comprises a fabric formed from a sheet of hollow-fiber membranes and a spacer material situated between adjacent membrane sheets, which are wound around a central core tube in the module.

WO 2013/039626 describes an aeration system with aerators that remain generally full of air when the supply of pressurized air is turned off or vented. Water does not reach dedicated bubble discharging holes of the aerator, which are kept from plugging. The aerator has a body with a hole through a wall of the body to discharge bubbles. The hole is surrounded by a skirt at the wall of the body. The skirt extends to below the elevation of the hole. The aerator body is connected to a source of pressurized gas through an open bottomed chamber. An opening between the aerator body and the inside of the chamber is located below the elevation of the hole. When the supply of gas is off, water enters the chamber and possibly the skirt. However, the water can only rise until it has reached the skirt and the opening, both of which are below the hole, and the entire aerator body is kept dry. Aerator fouling is reduced, and the aerator begins to produce an even flow of bubbles quickly when the supply of gas returns.

GENERAL DESCRIPTION

The present disclosure is based on the development of an improved reactor for treating water or water containing media. Specifically, an efficient, cost effective and time saving module for treatment of water has been developed making use of an elongated, sleeve like, enclosure in which gas flows and can diffuse from at least part of the sleeve-like enclosure's walls to water external to the enclosure, the gas being selected to participate in breakdown of matter within the water external to the sleeve (e.g. pollutants, organic matter); the water being further exposed to gas streams discharged from a diffuser arrangement as further discussed below.

Thus, the present disclosure provides, in accordance with a first of its aspects, a water treatment module that comprises at least one elongated gas enclosure that comprises a gas inlet and two vertical walls. At least one of the vertical walls has a water-impermeable and gas-permeable membrane with a water-facing side and a gas-facing side. The two vertical walls thus separate between water external to said gas enclosure and gas within said enclosure. The gas enclosure has a rolled or winded configuration to thereby define a convoluted horizontal path for the gas in the gas enclosure and one or more water-treatment spaces formed between opposite water facing sides of the gas enclosure, i.e. external to the convoluted enclosure. The module also comprises a diffuser arrangement with at least one gas diffuser configured for introducing a stream of gas (typically in a form of bubbles) into the one or more water treatment spaces.

In operation, gas diffuses through said membrane into the one or more water treatment spaces and participates in the breakdown of pollutants within the water. Further, in operation, the diffuser arrangement causes, inter alia, turbulence within the water which improves the performance of the treatment.

In some embodiments, the gas that diffuses through the membrane to the water treatment space(s) is or comprises oxygen, and bacteria, typically forming a biofilm on the membrane, utilizes the diffused oxygen and cause the breakdown of organic pollutants that exist in the water. The gas discharged from the at least one diffuser in the diffuser arrangement agitates the water in the water treatment space, making bacteria nutrients within the water more available to the bacteria, and causes biofilm adhered on the water facing side of the walls to break (by scouring the walls) thereby reducing or even avoiding biofilm clogging of walls and the water treatment space.

The convoluted enclosure may define one or more elongated water-treatment spaces configured to be in communication with said water. In some embodiments, the convoluted enclosure, along with its one or more water treatment spaces and the diffuser arrangement are submerged (partially or wholly) in water. The water can be within a dedicated tank, a pond, a natural water source etc, as further described below. In some other embodiments, the convoluted enclosure, along with its one or more elongated water-treatment spaces has one end in flow communication with a feed water inlet and one other end with a treated water outlet.

The diffuser arrangement is typically located below the convoluted gas enclosure. In some embodiments, the gas diffusers in the diffuser arrangement comprise gas release openings that are positioned below the one or more water-treatment spaces. As a result, and in accordance with some embodiments, gas streams ejected or released from the gas diffusers provide mixing of the water in the water treatment space, scouring of at least portions of water facing sides of the enclosure, enriching the water with gas required for the breakdown of matter therein etc.

In some embodiments, the module comprises one or more first spacer elements that are disposed within the elongated gas enclosure and are configured to maintain a first minimal distance between opposite gas facing sides of the two vertical walls. The one or more first spacer elements has typically a thickness or is otherwise configured to maintain the first minimal distance between about 1 to about 20 mm.

In some embodiments, the module comprises one or more second spacer elements disposed within the one or more water treatment spaces to maintain a second minimal distance between said opposite water-facing sides. The one or more first spacer elements has typically a thickness or is otherwise configured to maintain the second minimal distance between about 1 to about 20 mm.

In some embodiments, the thickness of the one or more first spacer element is between 1 to 10 mm, at times, between 2-4 mm.

In some embodiments, the thickness of the one or more second spacer elements is between 1 to 10 mm, at times, between 2-6 mm The one or more first and second spacer elements do not need to have the same thickness and in some embodiments, the thickness of the one or more first and second spacer elements is different.

The one or more first or second spacer elements can have the general form of a grid or net. While they can constitute independent elements, in some embodiments, the spacer element is integrally formed on at least a portion of one of the vertical walls. For example, such integral spacer elements can be configured as abutments on at least one vertical wall. The abutments can have the form of rails, dimples, corrugations, hook like protrusions or any combination thereof.

The two vertical walls of the enclosure are typically integral; for example formed (e.g. by extrusion) as an elongated sleeve. In yet some embodiment, the two vertical walls are welded to one another at their top and/or bottom ends.

By one embodiment the gas enclosure is rolled into a spiral. By another embodiment the gas enclosure is winded (folded) to form an accordion (zigzag or "back and forth snaking") gas flow path.

At least a portion of the water facing side of the water impermeable, gas permeable membrane supports biofilm growth thereon. In some embodiments, the water facing side of the water impermeable, gas permeable membrane that supports biofilm growth is surface treated or comprises material that supports biofilm development. In some embodiments the membrane provides a large surface area for biofilm growth thereon and the permeability of the membrane gives a selective advantage for the desirable bacteria, such as air supply from within the enclosure for aerobic bacteria methane supply from within the enclosure for methanotrophic bacteria for methane, thus supporting biofilm development.

The diffuser arrangement comprises gas openings for discharging gas streams into the water in the water treatment space.

In some embodiments, the diffuser arrangement comprises gas openings the provide bubbles into the water in the water-treatment space. In this context, the diffuser arrangement is considered as a gas sparging arrangement.

In some embodiments, the gas diffuser arrangement comprises a gas conduit with spaced apart gas openings.

In some other embodiments, the diffuser arrangement is formed as a second elongated enclosure below said gas enclosure. In some embodiments the second elongated enclosure is integrally formed with said gas enclosure as further described and illustrated hereinbelow.

A diffuser arrangement is also part of the present disclosure. Specifically, provided by this disclosure is also a diffuser arrangement that comprises at least one, but preferably a plurality of gas diffusers, each of which has a first conduit, a second conduit and a gas/liquid chamber. The first conduit is in gas communication at its top with one or more gas discharge openings and is in fluid communication at its bottom with the second conduit. The second conduit is in fluid communication at its top with the gas/liquid chamber. The gas/liquid chamber has a sealed top, opens at its bottom to a source of liquid and is in gas communication with a source of pressurized gas, the pressure being sufficient for displacing the liquid out of the chamber. In operation, the gas displaces the liquid from the gas/liquid chamber, and at the same time displaces the liquid from the two conduits (out of the discharge openings). Once all liquid has been displaced out of the two conduits a direct gas link is established between the gas/liquid chamber and the gas discharge openings causing a burst of gas discharge. This burst drains gas out of said chamber and reentry of liquid which causes the gas discharge burst to cease; and then this operational cycle restarts.

This diffuser arrangement is suitable for use in the water treatment module of this disclosure. In such use the source of liquid is typically the water to be treated. Such a diffuser can be separate from the gas enclosure and/or spacer elements. In some embodiments, this type of diffuser arrangement is integrally formed with a bottom portion of at least one of the vertical walls and/or a bottom portion of the second spacer element. In some embodiments, this type of diffuser arrangement is integrally formed at a bottom portion of the gas enclosure.

The gas enclosure can be held together with the aid of supporting structures.

In some embodiments, a top support structure is provided, that is connected to at least a top portion of said enclosure and configured for maintain the enclosure in its intended convoluted horizontal path configuration when the module submerged in water.

In some embodiments, a bottom support structure is provided, that is connected to at least a bottom portion of said enclosure and configured for maintaining the enclosure in its intended convoluted horizontal path configuration when the module submerged in water.

In some embodiments, the gas enclosure's configuration is supported by a central vertical support structure, typically, a tubular vertical support structure extending from top to bottom ends of the gas enclosure. The central tubular support structure can have a circular cross section, e.g. when the gas enclosure is spirally rolled, an elliptic cross section, a square cross section, etc. with the gas enclosure accordingly being rolled to correspond to the shape of the central tubular support element.

In some embodiments, the central support structure also provides a channel to receive the water to be treated and channel it into the one or more water treatment spaces.

The water treatment module may at times comprise two or more of said elongated gas enclosures stacked one on top of the other. In some embodiments, the two or more elongated gas enclosures are spaced by a support structure (each pair of modules "sandwiching" a support structure). In some embodiments, such stacked modules share a diffuser arrangement at the bottom of the lowest module in the stack.

Also provided by this disclosure is a bioreactor that comprises a water treatment tank with a feed water inlet and a treated water outlet and one or more modules of the kind described above. A bioreactor can comprise one, two three or more modules within the same tank.

In some embodiments, as further discussed below, a basin or a natural or artificial pond holding water to be treated can serve as a tank.

In some embodiments, the bioreactor is configured to discharge solid from the water being treated. To this end, and in accordance with some embodiments, the tank comprises a solid discharge outlet and, at times, also comprises a separation tank for receiving treated water and for removing solids from said treated water.

In some embodiments, the bioreactor comprises at a top portion of said treatment tank a water weir configured for receiving treated water and communicating the treated water to said treated water outlet. In some embodiments, the weir is constructed to receive clarified treated water.

In some embodiments, the bioreactor is provided with one or more sensors for monitoring various parameters that are indicative of the quality of water within said treatment tank.

The bioreactor can be part of a system. Accordingly, the present disclosure also provides a system comprising one or more such bioreactors and a controller for controlling operation of said one or more bioreactors.

In some embodiments, two or more bioreactors are interconnected in series such that treated water flowing out of one or more treatment tank of a bioreactor is the feed water of a subsequent one or more treatment tank of another bioreactor of the series. In some embodiments, two or more bioreactors can also be arranged in parallel for parallel flow of the water undergoing treatment through the two or more bioreactors. In yet some further embodiments, the system can comprise a combination of two or more bioreactors operated in series and along with two or more bioreactors arranged in parallel.

In some embodiments, the controller is configured to receive data from one or more sensors of said bioreactor and to controlled operation of said diffuser arrangement based on said data. For example, when quality of treated water discharged from the treated water outlet is below a predetermined threshold, said controller manipulates the diffuser arrangement to increase (volume and/or duration) of gas sparging into the water within the water treatment spaces.

Also provided by this disclosure is a method for treating water, the method comprises: introducing water into one or more water spaces of a bioreactor of the kind described herein; introducing a water-treatment gas into the at least one elongated gas enclosure; introducing gas into the diffuser arrangement to thereby cause the discharge of a stream of gas into the one or more water treatment spaces; and collecting treated water. As can be appreciated, the operational sequences defined above are not sequential but rather typically occur all in parallel.

Depending on that nature of pollutants in the water, the gas can be air, air enriched with oxygen or air supplemented with methane, pure oxygen, pure methane or any methane- or oxygen-containing gas. Where the water to be treated comprises organic matter and/or ammonia, the water-treatment gas is typically one that is rich in oxygen. Where the water to be treated comprises nitrogen oxides containing compounds (e.g. nitrate), the water-treatment gas can be also one that is rich in methane.

In some embodiments, the method comprises operating said diffuser arrangement to continuously or intermittently introducing gas into said water treatment space. In some embodiments, the introduced gas is in a form of discrete bubbles.

In some embodiments, the method comprises continuously (i) introducing water into a bioreactor; and (ii) collecting treated water.

In yet some embodiments, the method comprises periodically discharging treated water. In this embodiment, typically, there is arresting of operation of diffuser arrangement when discharging treated water.

In some embodiments, the method comprises any one of the following:
  holding bio-solids in suspended form in the treatment tank
  separating solids from treated water and circulating at least a portion of said solids into said treatment tank;
  discharging at least a portion of treated water from a top location of said treatment tank.

Finally, in some embodiments, the method comprises receiving data representing quality of said treated water and controlling operation of said diffuser arrangement based on said data.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which:

FIG. 3A is a schematic perspective view of a water treatment module in accordance with an embodiment of this disclosure.

FIGS. 3B-3D are enlarged, more detailed cutaway views of regions marked B-D, respectively, in FIG. 3A.

FIG. 3E is an enlarged more detailed view of the region marked E in FIG. 3D.

FIGS. 4B and 4C are side and bottom perspective views, respectively, with partial cutouts, of a flattened segment of a wall forming part of such treatment module.

DETAILED DESCRIPTION

Figure 1:
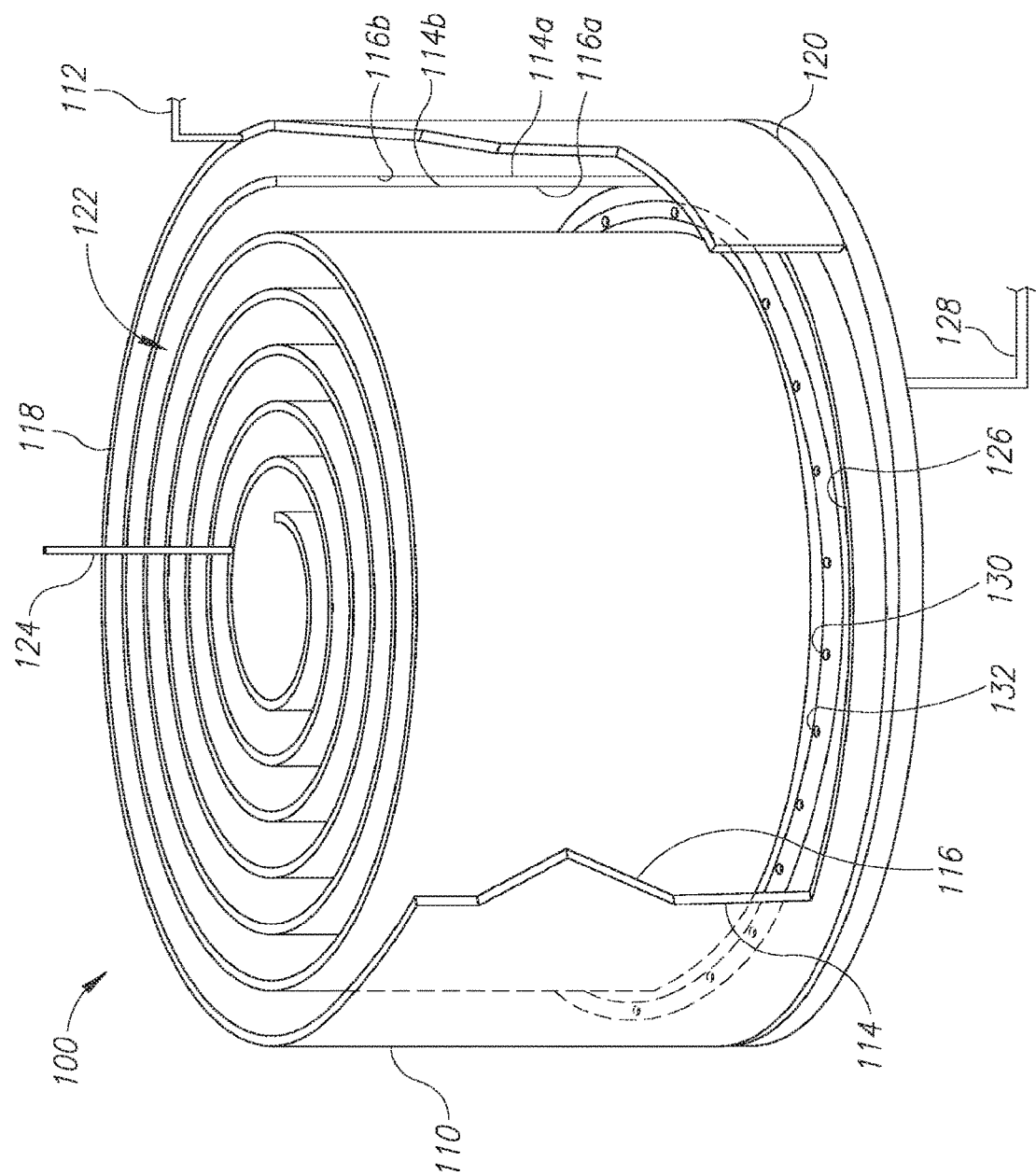
FIG. 1 is a schematic perspective view of a water treatment module in accordance with an embodiment of this disclosure.

Reference is made to FIG. 1 providing a water treatment module according to one embodiment of the present disclosure, generally designated 100 and comprising an elongated gas enclosure 110 comprising a gas inlet 112 and being defined between two vertical walls 114 and 116, at least one of which comprising a water-impermeable and gas-permeable membrane. Each wall 114 and 116 has a water-facing side 114a and 116a, respectively, and a gas-facing side 114b and 116b, respectively (the water-facing side and the gas-facing side are also referred to herein as "outer face" and "inner face", respectively).

The two vertical walls are longitudinally sealed at any of a top end 118 and bottom end 120 thereof. Sealing may be by welding, bonding, sewing or any other means of fixedly attaching the two walls so as to form a liquid-sealed enclosure. In an alternative embodiment, the enclosure is formed as a single unit where the two walls are integrally formed as part of an elongated sleeve.

Figure 7A:
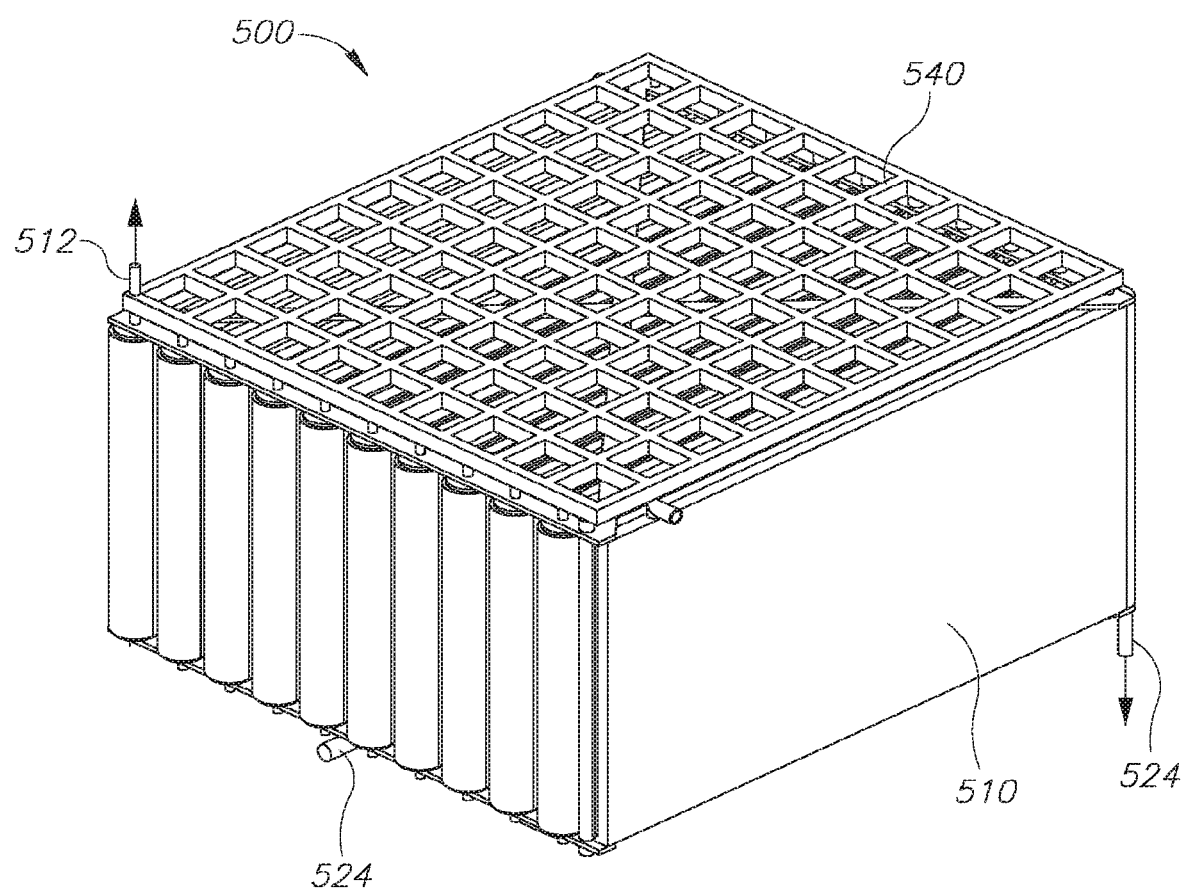
FIGS. 7A-7B are, respectively, a perspective view and an exploded view of a module in accordance with yet another embodiment of this disclosure.

Gas enclosure 110 is rolled or winded (folded) to form a convoluted horizontal path configuration. In this particular embodiment, gas enclosure 110 is rolled in a concentric spiral configuration. Yet, other configurations are equally applicable. In some alternative configurations, the convoluted horizontal path is provided by rolling the enclosure in an elliptical spiral configuration. Yet in some other alternative configurations, the convoluted horizontal path is provided by winding in an accordion ("back and forth snaking" or "zigzag") configuration, as illustrated in FIG. 7A.

Walls 114 and 116 define between their respective water-facing sides a continuous and equally spiraling water-treatment space 122 which is formed between opposite water-facing sides of enclosure 110. In some embodiments, the convoluted enclosure defines more than one elongated water treatment spaces. This is achieved, for example, by introducing partition walls extending vertically from one side of one wall to the facing side of its opposite wall (not illustrated).

Both walls 114 and 116 are water impermeable. At least one, and at times, both of walls 114 and 116 comprise gas permeable membrane portions. In some embodiments, the membrane comprises a polymer fabric. For example, the polymer fabric can be a non-woven polymeric fabric, such as a fabric formed from a first polymeric sheet extrusion coated or laminated with a second, water facing polymer film or layer. By some embodiments, the first polymeric sheet comprises a polyolefin (including a spun bonded polyolefin), such as polyethylene (particularly high density PE) or polypropylene, or comprises a polyester.

The water facing polymer film or layer is one that can provide the membrane with its water impermeability while permitting the gas permeability. In one embodiment, the water facing polymeric sheet comprises poly (n-alkyl acrylate) homo- and copolymers, known for their gas permeability. In yet an alternative embodiment, the water facing polymeric sheet comprises poly(methylpentene) such as poly(4-methyl-1-pentene) (PMP), typically used in gas permeable packaging.

It is noted that poly (n-alkyl acrylate) are compatible with polyolefins while poly(methylpentene) are compatible with polyesters. Accordingly, in one embodiment, the water impermeable, gas permeable membrane comprises a first polymeric sheet comprising a polyolefin and a water facing polymeric sheet comprising a poly (n-alkyl acrylate); and in another embodiments, the water impermeable, gas permeable membrane comprises polyester and a water facing polymeric sheet comprising a PMP.

The polymers forming the water impermeable, gas permeable membrane can be combined by any suitable technique known in the art such as extrusion coating, hot lamination and/or cold lamination.

The present disclosure also provides an elongated enclosure comprising a wall separating from an internal elongated path within said enclosure and a space external to said elongated enclosure, the wall comprising a first polymeric material extrusion coated with a second water impermeable, gas permeable membrane.

It is to be noted that the exemplary polymeric fabrics and materials described above are applicable also for use in other embodiments described above.

Gas enters the gas enclosure through inlet 112 and while it flows along the gas enclosure 110 portions thereof diffuse into the surrounding water in the water space via the gas impermeable membrane. At times, and in accordance with some embodiments, gas enclosure 110 comprises a gas outlet 124 from which the gas is either vented to the atmosphere, blown into the water within the water treatment space, collected and/or re-circulated into the gas enclosure. The gas flow is generally in the direction from gas inlet 112 to gas outlet 124 and in the FIG. 1, this direction follows a generally horizontal spiral path.

In use, when water space 122 accommodates contaminated or polluted water, a biofilm will grow on the water facing side of the wall comprising the water impermeable, gas permeable membrane. Module 100 further comprises a diffuser arrangement 126 comprising a gas inlet 128, being in gas-flow communication via dedicated tubes, such as a manifold 130 to diffusers 132, each having at least one opening configured to release a stream of gas bubbles into the water treatment space 122. In some embodiments, the diffuser arrangement 126 is constructed and operative to introduce a stream of gas bubbles such that it flows upwards alongside the water-facing walls of the gas enclosure 110. In some embodiments, the gas discharged from the diffuser's openings facilitates water turbulence and mixing, to support biofilm growth on the one hand and minimize clogging of the water space by the growing biofilm, on the other hand.

In the embodiment illustrated in FIG. 1, the diffusers 132 are located at a bottom portion of enclosure 110 and when in operation, gas bubbles are discharged out of opening 134, move up through water treatment space 122 and generally alongside opposite facing water facing sides of enclosure 110. This stream of gas bubbles provides at least one of (i) mixing the water volume to allow biofilm nutrients present in the water to come into contact with biofilm suspended in the water and attached to the membrane along generally the entire length of the water facing side of the enclosure walls; and (ii) scouring biofilm adhered to the membrane, thereby minimizing clogging of the water space by the biofilm; and (iii) suspending and homogenizing settling biomass into the water volume in the water treatment space.

In some embodiments, diffusers 132 are configured to provide fine bubbles. In some embodiments, the diffusers are configured as a porous or perforated tube, a punched or perforated membrane, a membrane with fine pores or a nozzle.

Figure 4A:
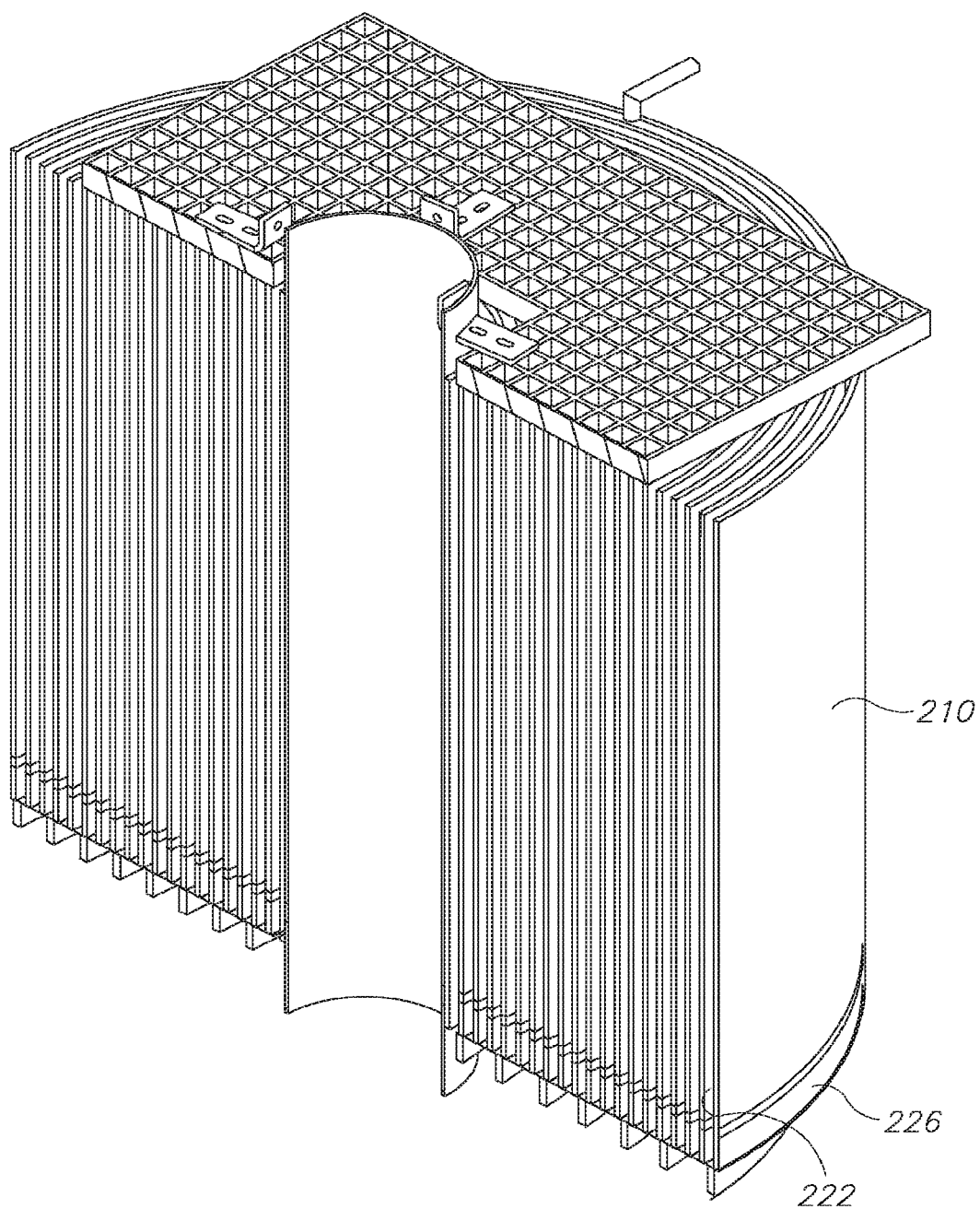
FIG. 4A is a schematic perspective cross-section of a water treatment module in accordance with an embodiment of this disclosure.
Figures 5A, 5B:
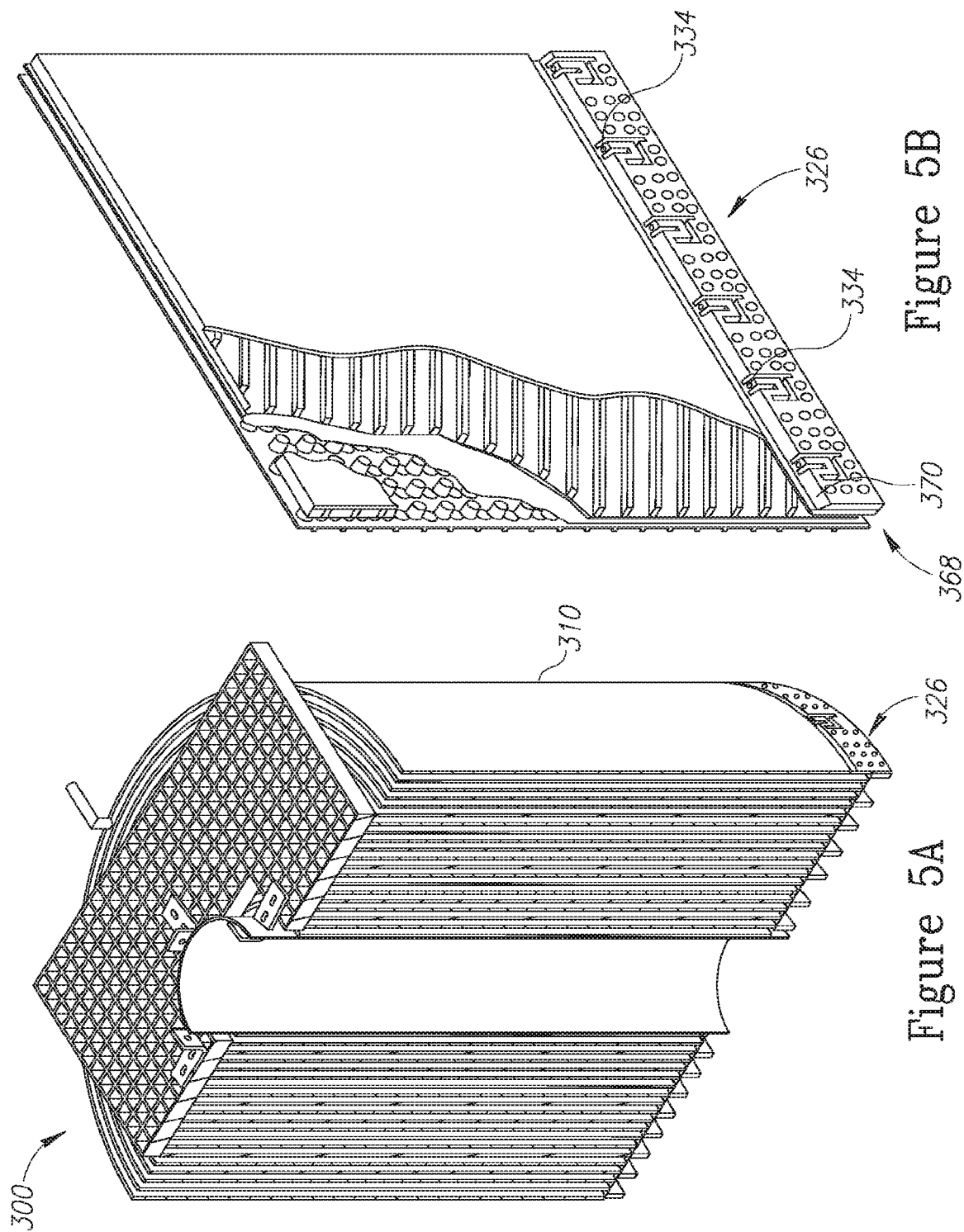
FIG. 5A is a schematic perspective cross-section of a water treatment module in accordance with an embodiment of this disclosure.
FIG. 5B is a perspective view, with partial cutouts of a flattened segment of a wall forming part of such treatment module.
Figure 5C:
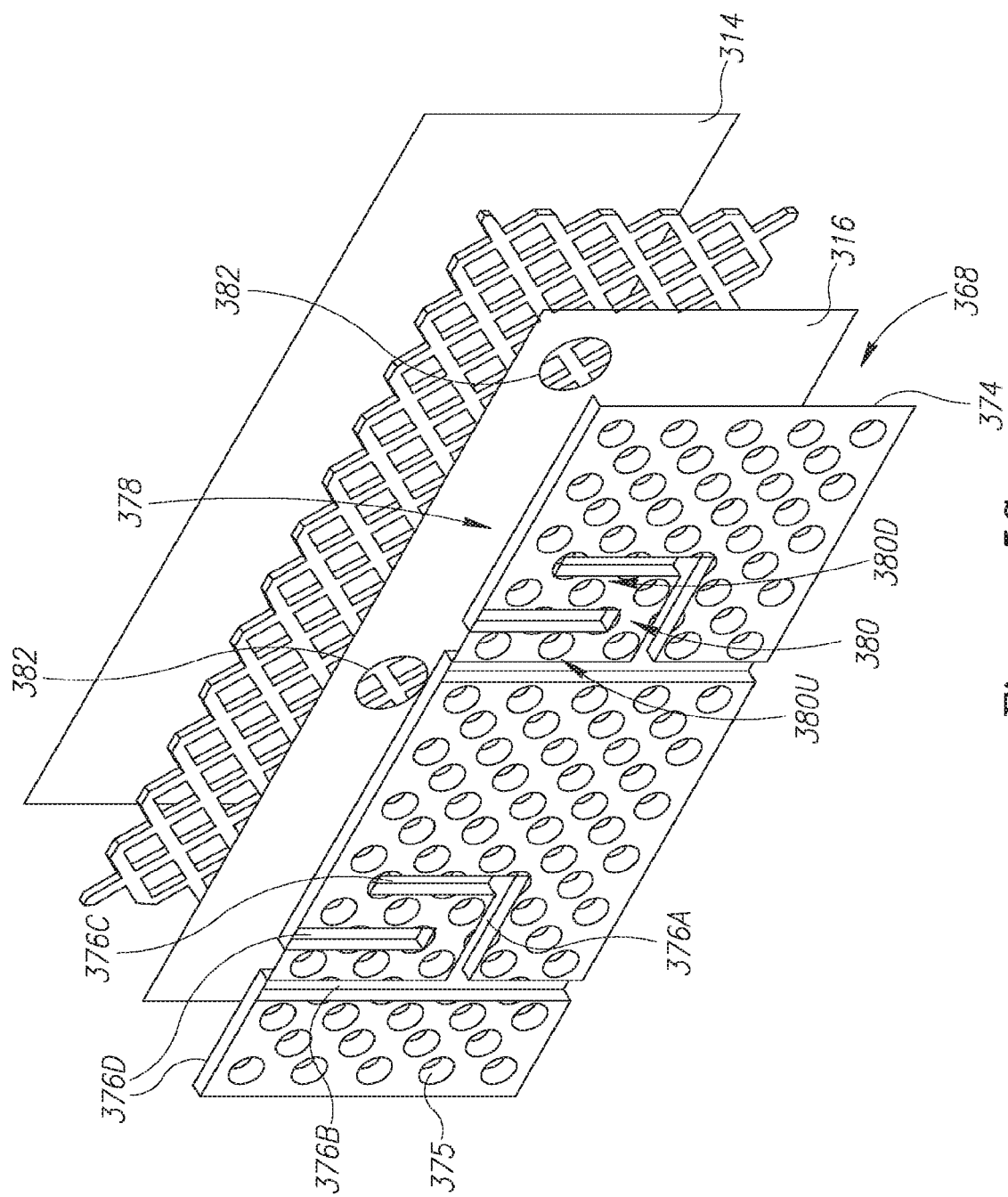
FIG. 5C is an exploded view of the bottom portion of the segment of FIG. 5B illustrating the diffuser.
Figure 5D:
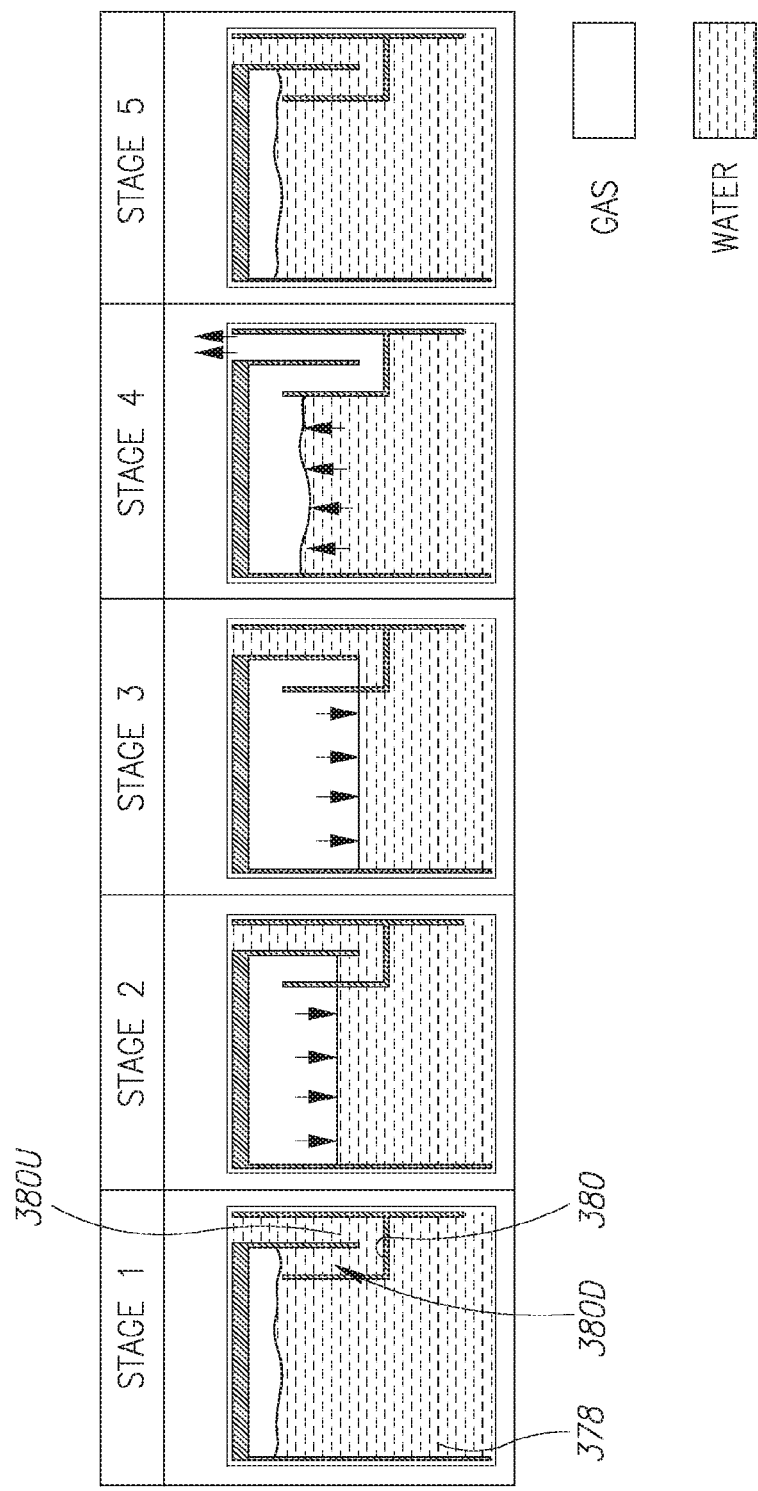
FIG. 5D are schematic illustrations of operational stages of the diffuser of FIG. 5C.
Figures 6A, 6B:
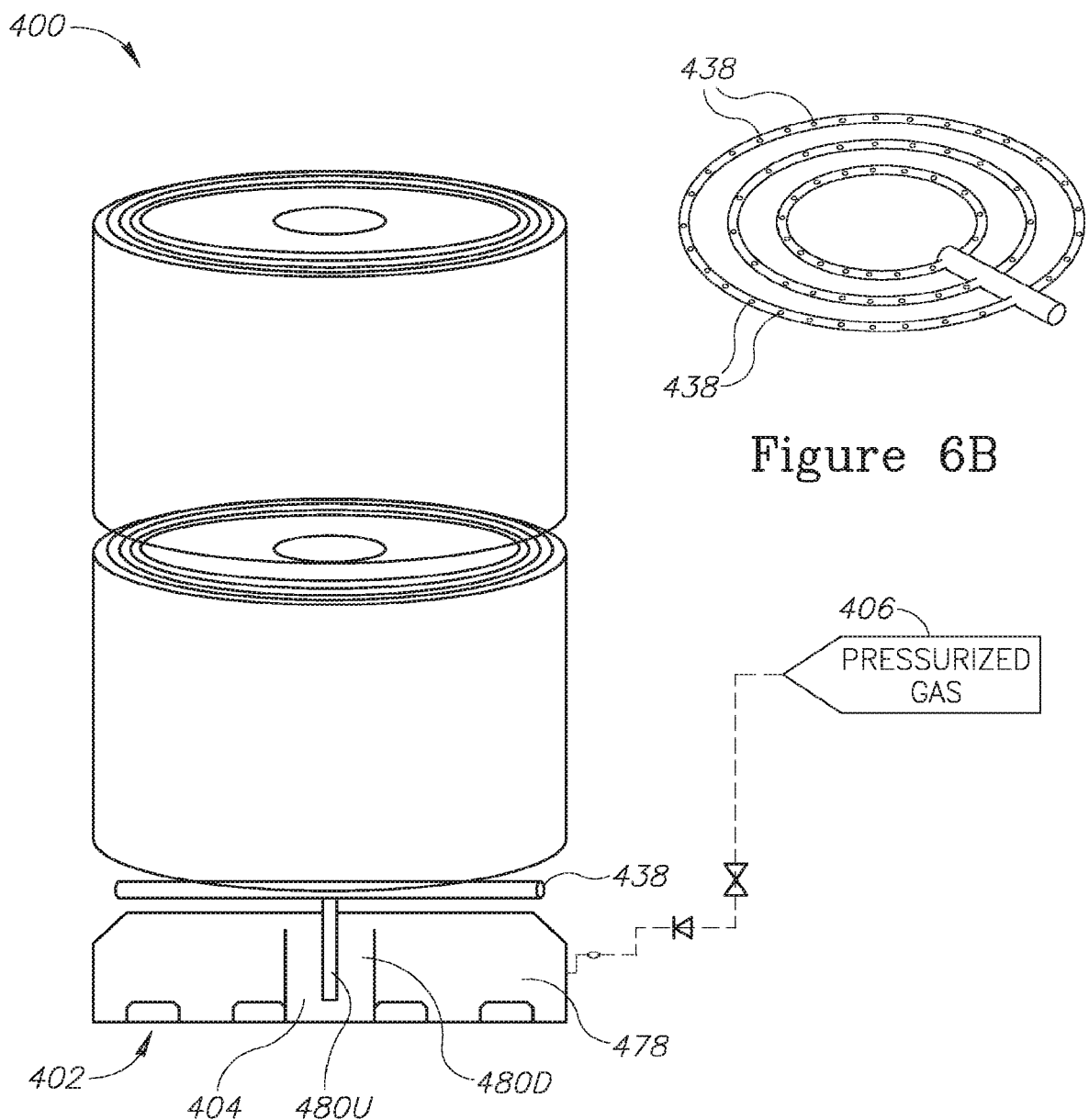
FIGS. 6A and 6B are, respectively, side elevation and view from above of a diffuser arrangement in accordance with an embodiment of this disclosure.

In accordance with some other exemplary embodiments, the diffusers can have downward facing openings, such as seen in FIGS. 4A-4C or can have a configuration as shown in FIGS. 5A-5D or as that shown in FIGS. 6A-6B. The diffusers can be configured to operate in a continuous mode, i.e. introducing a continuous stream of bubbles or can be configured to operate in an intermittent mode or only upon need (e.g. when there is a risk of clogging or indications of clogging).

Figure 2A:
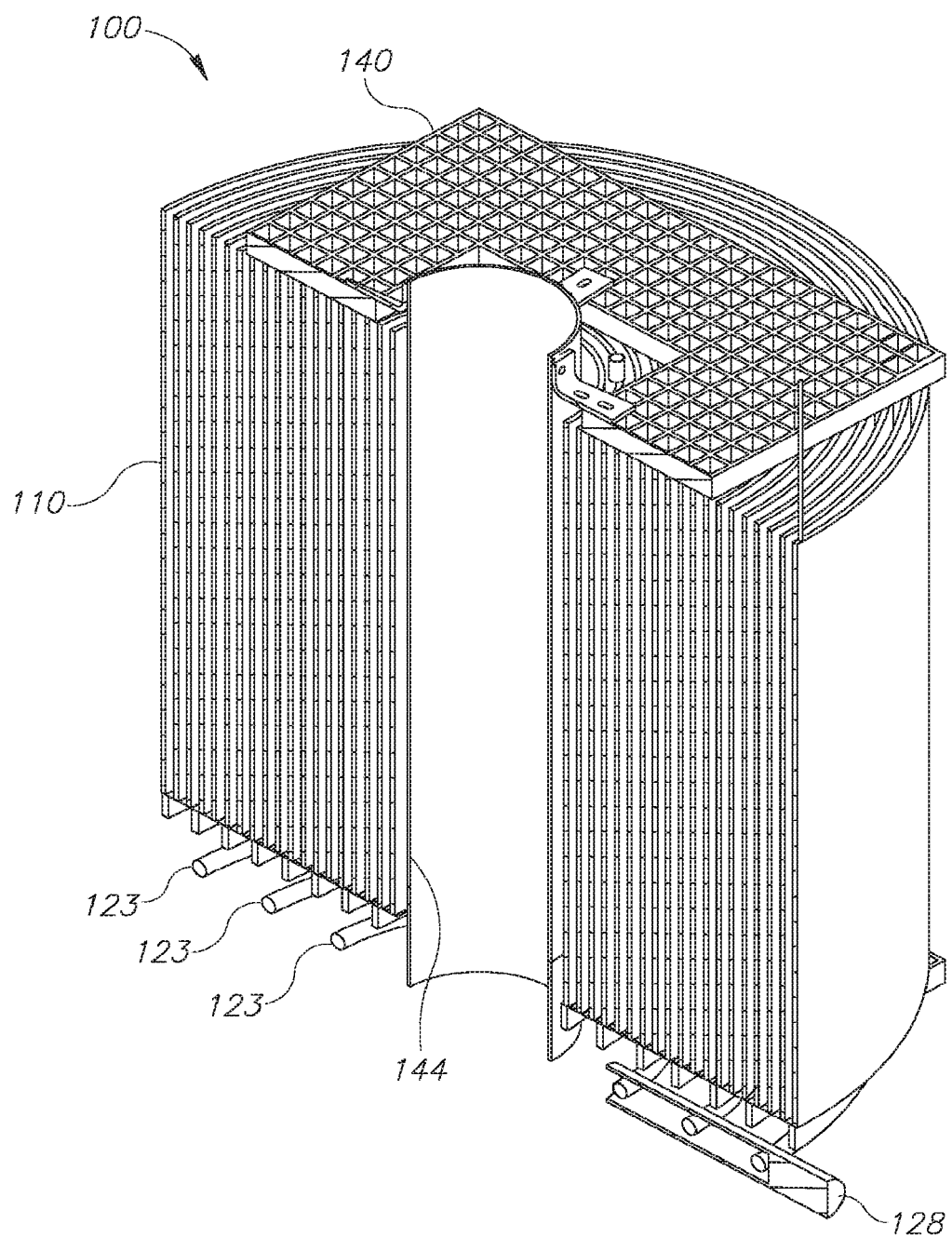
FIGS. 2A and 2B are, respectively, a schematic perspective cross-section (FIG. 2A) and exploded (FIG. 2B) views of the water treatment module of FIG. 1.
Figure 2B:
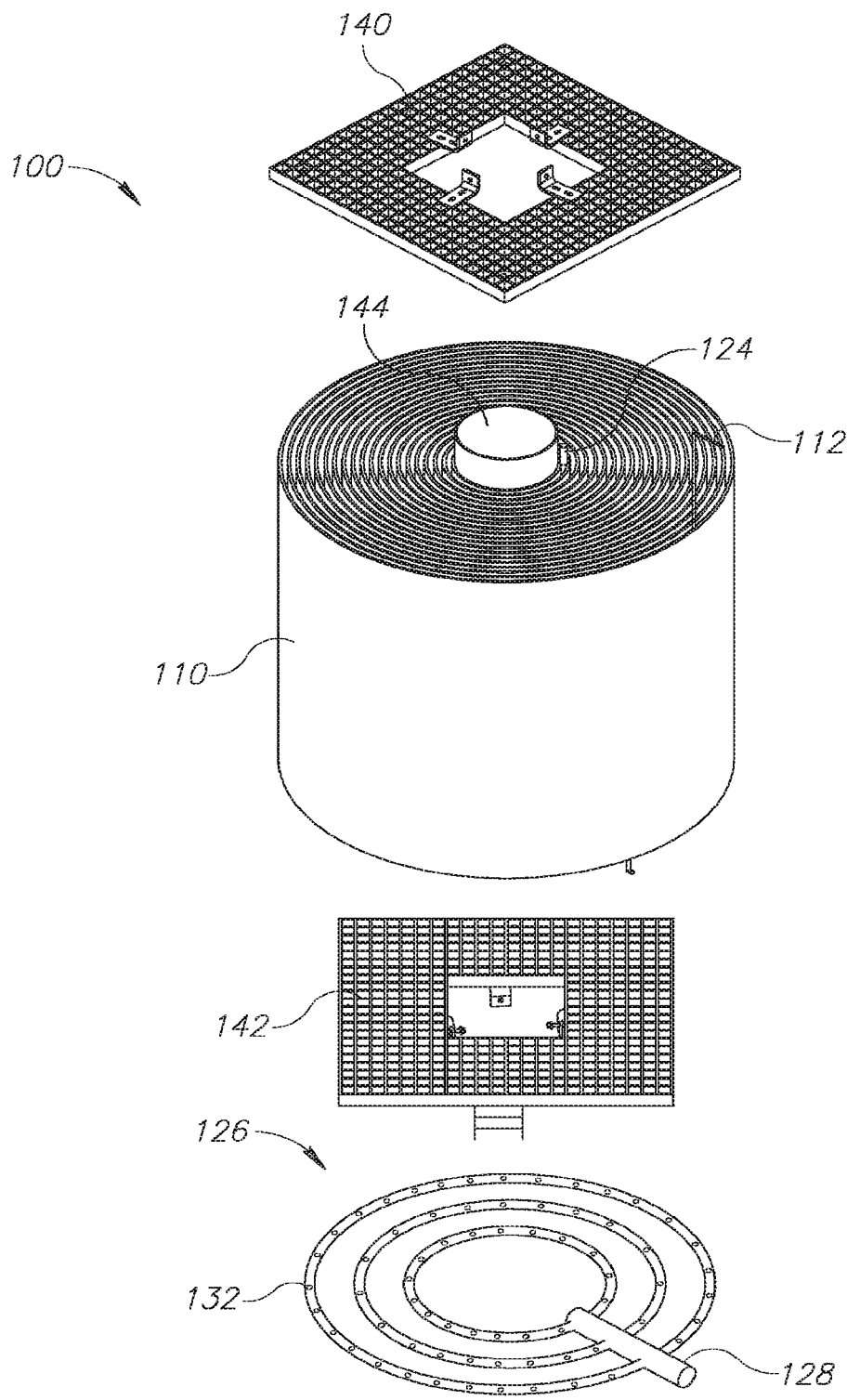

An exemplary module, by an embodiment of this disclosure, is shown in FIGS. 2A and 2B. For simplicity, same numbers are used to represent elements that have a similar function or structure to those of FIG. 1 and the reader is referred to the description of FIG. 1 for explanation of structure or function. In FIGS. 2A-2B attention is made to diffuser arrangement 126 that includes a supply tube 128 that is connected to a source (not shown) of gas, typically pressurized air, linked to a manifold or array of tubes (3 in this example of circular tubes) 123 with a plurality of gas discharge openings (not seen). In some embodiments the gas discharge openings are formed at the bottom of the tubes. In some embodiments, the manifold or array of tubes are arranged as an array of generally parallel straight tubes.

Illustrated in FIGS. 2A and 2B is also a reinforcing structure that includes a top support element 140, a bottom support element 142 and central core element 144. The bottom support element, which is structured as a mesh, also enables air passage from the diffuser arrangement 126 to the entire water treatment space as well as water passage into the water treatment spaces.

In some embodiments, module 100 contains at least one of the reinforcing/support elements. In some alternative embodiments a combination of the said reinforcing elements are included in the module.

The support element (top, bottom and/or core) is configured for retaining enclosure 110 in its convoluted configuration, preferably when the gas enclosure is submerged (even partially) in water. The fixation is achieved, for example, by connecting or otherwise firmly attaching enclosure 110 to said reinforcing structures. At times, top support element 140 and bottom support element 142 are fixed to central core element 144.

Bottom support element 142 is also configured and operative to hold enclosure 110 above diffuser arrangement 120. Where multiple modules 100 are stacked one on top of the other, there can be a single bottom support element 142 below the bottom module and one top support element 140 above the upper module or there may be provided also intermediate support elements that are positioned between two stacked modules. A single central core structure 144 can be used to concentrically align two or more stacked water treatment modules.

In some embodiments, central core structure 144 serves also as a feed buffer (or feed well) for the water between intermittent gas sparging from the diffusers and thereby water mixing events, through which it is mixed into the water treatment spaces during the intermittent mixing event and as a result of which raw wastewater (i.e. water before treatment) does not come in direct contact with the vertical walls (and the membrane) and does not cause biofilm overgrowth and consequent clogging of the membrane.

The present disclosure also provides a bioreactor comprising a water impermeable, gas permeable membrane within a water treatment chamber, and a second chamber integrally formed within said bioreactor, the second chamber configured to receive water to be treated and communicate said water to the water treatment chamber. In some embodiments, the second chamber is physically located within the water treatment chamber.

The reinforcing structures can be configured in a variety of shapes and formed of a variety of materials, such as, and without being limited thereto, fiberglass, a fiber reinforced polymer and/or stainless steel.

In some embodiments, central core element 144 can act as a skeleton to which elements of module 100 are connected and thus fixed in place. In some embodiments, central core structure 144 has a cross section dimension of at least 200 mm. As appreciated, the dimensions of central core structure 144 can vary depending on the overall dimensions of the module. Generally, the cross section dimensions of the central core structure should be small with respect to efficient volume usage, but yet, not too small, to allow the rolling of the gas enclosure around it and to the sufficient water flow therethrough during operation.

Turning now to FIGS. 3A-3E there is illustrated a water treatment module similar to that of FIG. 1 and FIG. 2, now showing the spacer elements. For simplicity, same reference numerals used in FIGS. 1 and 2 are used to represent identical elements in FIGS. 3A-3E and the reader is referred to the above descriptions for explanation of the structure and function of such elements.

FIG. 3B provides an enlargement of section B from in FIG. 3A and illustrates a first spacer element 150, disposed within elongated gas enclosure 110 and configured to maintain a first minimal distance between opposite gas facing sides of the two vertical walls 114 and 116 of enclosure 110. First spacer element 150 of this embodiment has a net-like configuration. In some embodiments, first spacer element 150 can extend throughout the entire enclosure and in some other embodiments, several separated spacer elements are disposed along enclosure 110, each occupying a segment thereof.

First spacer element 150 is designed to ensure an open pathway for the gas flowing in gas enclosure 110, and in other words, a minimal distance between opposite gas facing walls of the gas enclosure 110.

As can be seen in FIG. 3C, a second spacer element 160 is disposed in the water treatment space 122, between opposite facing water facing sides of enclosure 110. The second spacer element 160 is configured to maintain a second minimal distance between said two opposite facing water facing sides of enclosure 110.

In some embodiments, second spacer element 160 is a sheet that has an array of dimpled abutments 162 (namely each defining dimples on one side and protrusions on the other) projecting in opposite sides of sheet, the distance between the plane defined by the apex of the protrusions at one side and that defined by the protrusions at the other side defining the thickness of spacer element 160. These protrusions that are formed by forming portions of the sheet (thus leaving a depression at the opposite side) can also be seen in FIG. 3E.

Second spacer element is disposed alongside enclosure 110, at the water treatment space. In some embodiments, second spacer element 160 can extend throughout the entire water treatment space alongside the enclosure 110 and in some other embodiments, several separated spacer elements are disposed within said space, each occupying a segment thereof.

Second spacer element 160 is designed to ensure an open space for the water within the water treatment space 122; and in other words, a minimal distance between opposite facing water facing sides of the walls of the enclosure 110. While the space 122 can, at times, expand, the second spacer ensures that the clearance between the two vertical walls would not be less than the minimal distance dictated by the width of second spacer element.

It is noted that the structure and configuration of the first spacer element 150 and second spacer element 160 is but an example and is not limited to those illustrated. Additionally, first and second spacer element can have the same or different configuration, each independently can be in the form of an open flow or hydraulic element, such as a net, or a sheet with protrusions, such as the illustrated dimpled sheet. In some embodiments, the protrusion extend in only one direction from the sheet (one sided protrusions) and in some other embodiments, the protrusion extend from the sheet in two opposite directions (double sided protrusions), as shown in FIG. 3C and FIG. 3E.

As alternative to a dimpled sheet, the spacer can comprise distributed individual and discrete three dimensional elements attached to at least one side of at least one of the vertical walls and thus maintaining the distance dictated by the discrete elements' thickness. In some embodiments, the individual elements are formed of a polymer material such as hot glue applied onto any of the water facing side and/or air facing sides of the vertical walls. In other embodiments the individual elements are formed of pieces, such as plastic discs, placed onto the side of any of the water facing side and/or air facing side of the one or both vertical walls.

The present disclosure also provides a bioreactor with at least one spacer element comprising a surface holding, discrete, spaced apart, abutments (three dimensional elements). In some embodiments, the spaced apart abutments are located on a water impermeable, gas permeable membrane as disclosed herein.

Also disclosed herein is an elongated enclosure comprising a wall separating from an internal elongated path within said enclosure and a space external to said elongated enclosure, the wall integrally comprising discrete, spaced apart abutments of a kind described herein.

In some embodiments, the membrane with the spaced apart abutments forms part of a bioreactor of a kind described herein.

In some embodiments, the first and/or second spacer element is a combination of any of the above spacer configurations. For example, the spacer element can comprise a net like structure that is laminated to a dimpled sheet, etc.

The minimal distance dictated by first spacer element, as illustrated spacer element 150 and the minimal distance dictated by second spacer element, as illustrated spacer element 160 are independent from one another and can be the same or different.

The selection of the type and/or width of the second spacer can depend on the type of water to be treated. The selection of the type and/or width of the first spacer can depend on the type of gas to be introduced into the enclosure and some operational conditions, such as pressure of gas within the enclosure and others.

When using spacers of same configuration, they are arranged such that they do not interdigitate, e.g. when both spacers have protrusions, such as the exemplified dimples, the spacers can be arranged such a protrusion/dimple from one spacer essentially faces an opposite protrusion/dimple from the other spacer so as to avoid interdigitation of the protrusions. Similarly, when using one spacer in a form of a grid or a net, and the other in a form of a sheet of protrusions, the spacers can be arranged such that the protrusions do not fit into the openings of the other spacer.

The spacer elements may be of the same or different material. In some embodiments, spacer element 150 and spacer element 160 are each, independently made, from a water durable polymeric material. Non-limiting examples of polymeric materials include high density polyethylene, low density polyethylene, polyethylene terephthalate (PET), polypropylene, polyamide.

In some examples, the spacers are characterized by having a compressive strength of above 2 ton/m$^2$, at times, above 20 ton/m$^2$ as determined by the manufacturer and tested by internationally known standards to comply with at least two requisites: (i) withstand forces applied during processing and (ii) withstand water pressure (mainly applicable to requirements from first spacer 150).

FIG. 3E is a top enlarged view of a portion of module 100 showing specifically top support element 140, central core element 144 with gas outlet 124. In the exemplary embodiment of FIGS. 3A-3E elongated enclosure 110 is rolled over central core structure 144.

While in certain embodiments, the first and second spacer elements are separately formed elements, in some other embodiments, the first or the second spacer element is integrally formed with at least one of the vertical walls of enclosure 110. At times, thus, the integral-vertical wall is configured to provide several functionalities: (i) water impermeability; (ii) water side spacing; (iii) gas side spacing and (iv) optionally gas permeability and biofilm growth support. This can be achieved, for example, and without being limited thereto, by a water impermeable, gas permeable membrane having, integrally formed protrusions formed on the inner face and on the outer face.

Similarly, in some other embodiments, the second spacer element is integrally formed with at least one of the vertical walls of enclosure 110. This means that at least one of the enclosure's vertical walls is configured to provide also the minimal required distance from its opposite facing water facing vertical wall. In other word, the membrane has protrusions on one water-facing side that maintain spacing from the opposite facing wall. In some embodiments, the integral spacer-vertical wall is configured to provide several functionalities: (i) water impermeability; (ii) water side spacing; (iii) optionally gas permeability and biofilm growth support. This can be achieved, for example, and without being limited thereto, using a water impermeable, gas permeable (optional) membrane having, integrally formed therewith, outwardly extending protrusions.

In some embodiments, only one of the two vertical walls of an enclosure is gas permeable. In some embodiments, only portions of one or both the two vertical walls are gas permeable. In yet some other embodiments, one or both of the vertical walls of an enclosure are essentially entirely gas permeable.

The present disclosure also provides an elongated enclosure comprising a wall separating from an internal elongated path within said enclosure and a space external to said elongated enclosure, at least a portion of the wall comprising a gas permeable membrane, said wall further comprising spaced apart abutments extending outwardly from said enclosure and/or inwardly into said internal path.

Reference is now made to FIGS. 4A-4C which schematically illustrate a module with a diffuser arrangement in accordance with another embodiment of the present disclosure. Like reference numerals to those used in FIGS. 1 to 3, shifted by 100 are used to identify components having a similar function. For example, component 110 in FIG. 1 is an enclosure the same function as enclosure 210 in FIG. 4A. The reader is referred to the respective description above for an explanation of structure and function of such elements.

The embodiment illustrated in FIGS. 4A-4C differs from the module illustrated in FIGS. 1-3 in the configuration of the aeration arrangement, being now provided in a form of an elongated second enclosure 226, formed between two vertical walls 214' and 216' which are an extension of and are integrally formed with walls 214 and 216, respectively.

Diffuser arrangement 226 is provided with a gas inlet aperture 264 and spaced apart gas diffuser openings 232 in the form of openings formed at the bottom side of enclosure 226 such that gas bubbles are discharged out of openings 232 into water treatment space 222 and ascend along the external face of the wall of enclosure 210 as represented by arrow 233. As can be seen diffuser arrangement 226 also includes a spacer element 250' that is shown to have the same configuration as that of element 250 (albeit, can have a different configuration).

The present disclosure also provides an elongated enclosure comprising a wall separating from an internal elongated path within said enclosure and a space external to said elongated enclosure, said enclosure comprising a first elongated zone for treating water and an integrally formed, second elongated zone, parallel to said first elongated zone that is configured to discharge gas to faces of the elongated enclosure at said first elongated zone.

FIGS. 5A-5C illustrate a water treatment module in accordance with another embodiment of the present disclosure. For simplicity, like reference numerals to those used in FIGS. 1 to 3, shifted by 200 are used to identify components having a similar function. For example, component 110 in FIG. 1 is an enclosure the same function as enclosure 310 in FIG. 5A. The reader is referred to the relevant portions of this description for explanation of structure and function.

The unique features of module 300 of this disclosure are the diffusers in the diffuser arrangement that are seen in FIG. 5B and in more details in FIG. 5C. This diffuser arrangement, as will be explained further below, is operative to discharge gas in pulses (acting as a pulsating discharge diffuser). The manner of operation is schematically illustrated in FIG. 5D.

Diffuser arrangement 326 of this embodiment includes an elongated inverted trough-shaped element 368 that has a sealed top end 370 (see FIG. 5B) with a plurality of openings 334 and an open bottom. As can best be seen in FIG. 5C element 368 is formed between a dimpled panel 374 that has a plurality of depressions 375 and the bottom portion of vertical wall 316 of the gas enclosure 310. Formed in panel 374 are also elongated recesses, including a first, horizontal elongated recess 376A and three vertical elongated recesses including a second recess 376B that extends from top to bottom of dimpled panel 374, third recess 376C that extends upward from the end of depression 376A and ends below the panel's top end 370 and fourth recess 376D that extends downward from the panel's top end 370 towards a mid-portion of first recess 376A but ends above it. The depth of the depression and the elongated recesses as well the width of the wall that defines the top end 370 are all substantially the same and consequently the depressions and the recesses bear on wall 316 and are adhered to the opposite portions of wall 316. Through such adherence a liquid/gas chamber 378 with an open bottom is defined between two consecutive recesses 376B that is linked through a generally U-shaped conduit 380 that includes a downward conduit segment 380D and an upward conduit segment 380U that ends at opening 334. The bottom portion of wall 316 includes a plurality of apertures 382 that open each into one of chambers 378 permitting gas from enclosure 310 to enter into chamber 378 through its open bottom, to fill the chamber and exit therefrom to evacuate the chamber. By the action of the gas pressure entering through apertures 382, gas will be released out of openings 334 in a pulsating manner, as will be illustrated below with reference to FIG. 5D.

The manner of operation of the diffuser arrangement of this embodiment is illustrated in FIG. 5D. At first (stage 1), chamber 378 is filled with water, entering through the opened bottom. Equally, both segments of conduit 380 (shown by segment 380D and 380U) are also filled with water, entering through opening 334. However, gas pressure (through apertures 382; not shown in this Figure), represented by the downward arrows exerts a displacing force on the water within the chamber and in conduit 380 (Stages 2). Following a threshold phase, at which water level reaches the bottom level of conduit segment 380U (Stage 3), all water is drained from the conduit and then gas from chamber 378 can flow out through opening 334 in a burst that drains the gas from the chamber (Stage 4), permitting return of the liquid, as represented by the upwards arrows, until return to the original stage (Stage 5).

FIG. 6 is a schematic illustration of a diffuser arrangement of another embodiment that although structurally different, operates in a functionally similar manner to that of FIGS. 5A-5D. The diffuser arrangement, generally designated 402, is part of a module 400 and includes a gas/liquid chamber 478 that has an open bottom and is linked to a source of pressurized air 406. Formed within chamber 478 is an upwardly directed first generally vertical conduit 480D that is functionally equivalent to downward tube 380D and defines a cylindrical space 404 accommodating a second generally vertical conduit 480U that is functionally equivalent to upward tube 380U and is in fluid communication with diffuser head 438 that in this embodiment includes two crossed arrays of openings (FIG. 6B) but may also have a large number of other configurations.

From an operational point of view, initially the gas/liquid chamber 478, the cylindrical space 404 defined by the first generally vertical conduit 380D and the second generally vertical conduit 480U are filled with water. Then gas pressure exerts a water-displacing force that causes lowering if the water level in gas/liquid chamber 478 and, at the same time, pushing the water downwardly in the first generally vertical conduit 480D and in the second generally vertical conduit 380D that exits through the diffusers 438. Once the first generally vertical conduit 480D and the second generally vertical conduit 480U are drained of water, gas communication downwardly into the first generally vertical conduit 480D and upwardly in the second generally vertical conduit 480U so established causes a burst of gas discharge out of diffuser head 434. This burst drains the gas causing water to re-enter and a restart of this operational cycle.

Figure 7B:
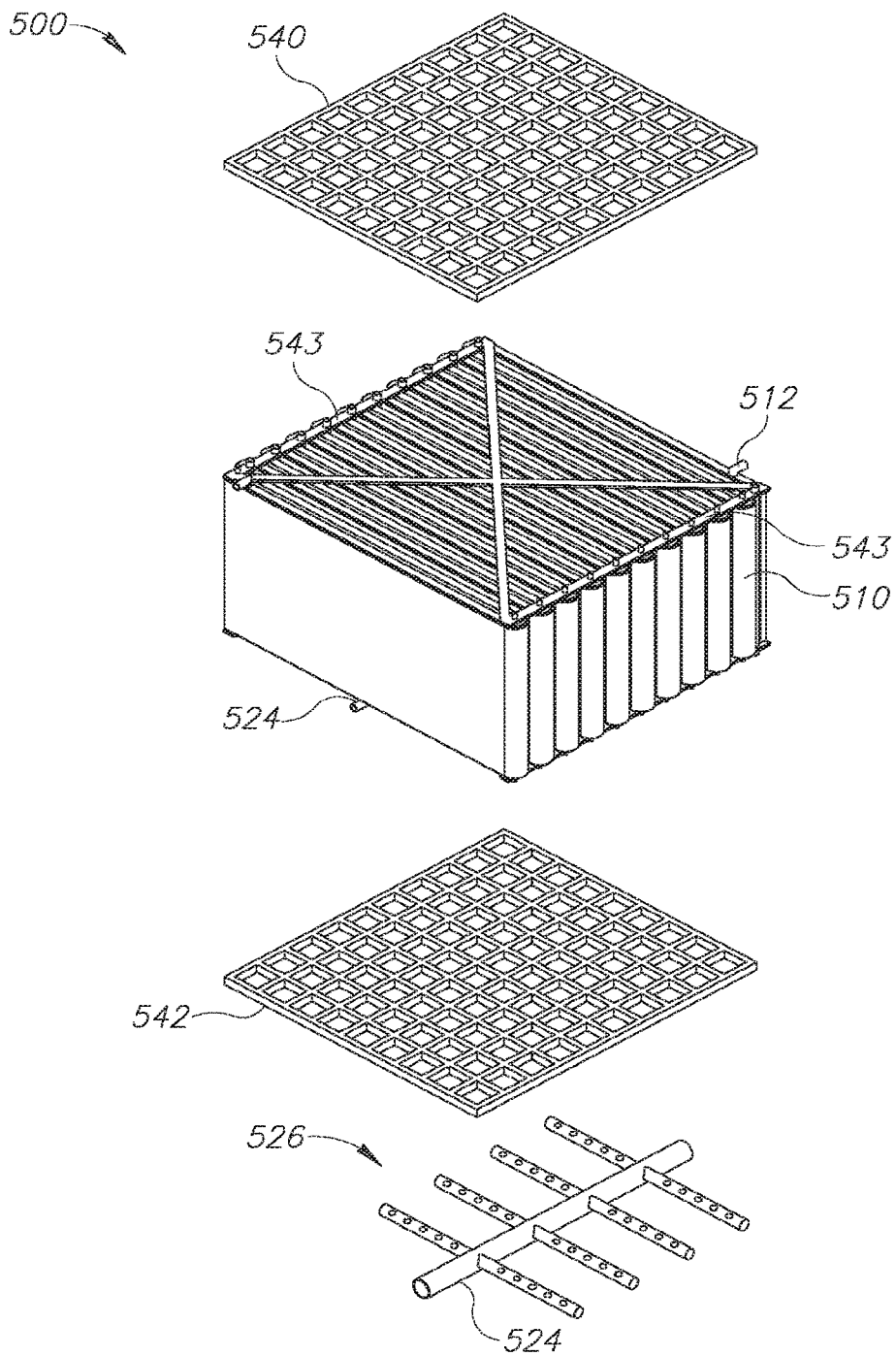

Turning now to alternative configurations of the module disclosed herein, reference is made to FIGS. 7A-7B providing a schematic perspective illustration of a module 500 in accordance with another embodiment. For simplicity, like reference numerals to those used in FIG. 3A, shifted by 400 are used to identify components having a similar function. For example, component 110 in FIG. 2 is a gas enclosure having the same function as gas enclosure 510 in FIGS. 7A-7B.

FIGS. 7A and 7B illustrate a module 500 with gas inlet 512 and gas outlet 524, top support element 540 and bottom support element 542 and a diffuser arrangement 526 with a plurality of gas-discharge nozzles scattered along the entire length of tube (not shown). The gas enclosure 510 is in a back and forth winding (zigzag) configuration instead of the concentric, spiral, configuration described above.

In some embodiments enclosure 510 is winding over or around vertical elements 543 of a supporting structure 540.

In some embodiments enclosure 510 has several gas inlets, similar to gas inlet 512 along its length and several gas outlets, like gas outlet 524 in order to reduce pressure drop or head losses. In some point along the length of elongated enclosure 510 there is an outlet (not illustrated) for discharge of condensated water and leaks. Otherwise, this module operates functionally in a similar manner to water treatment modules of other embodiments described above.

In some embodiments, the module forms a part of a bioreactor, where one or more of the disclosed modules are placed within a water environment, e.g. tank, basin, water pond etc as further detailed with respect to FIGS. 9A and 9B below.

Figure 8A:
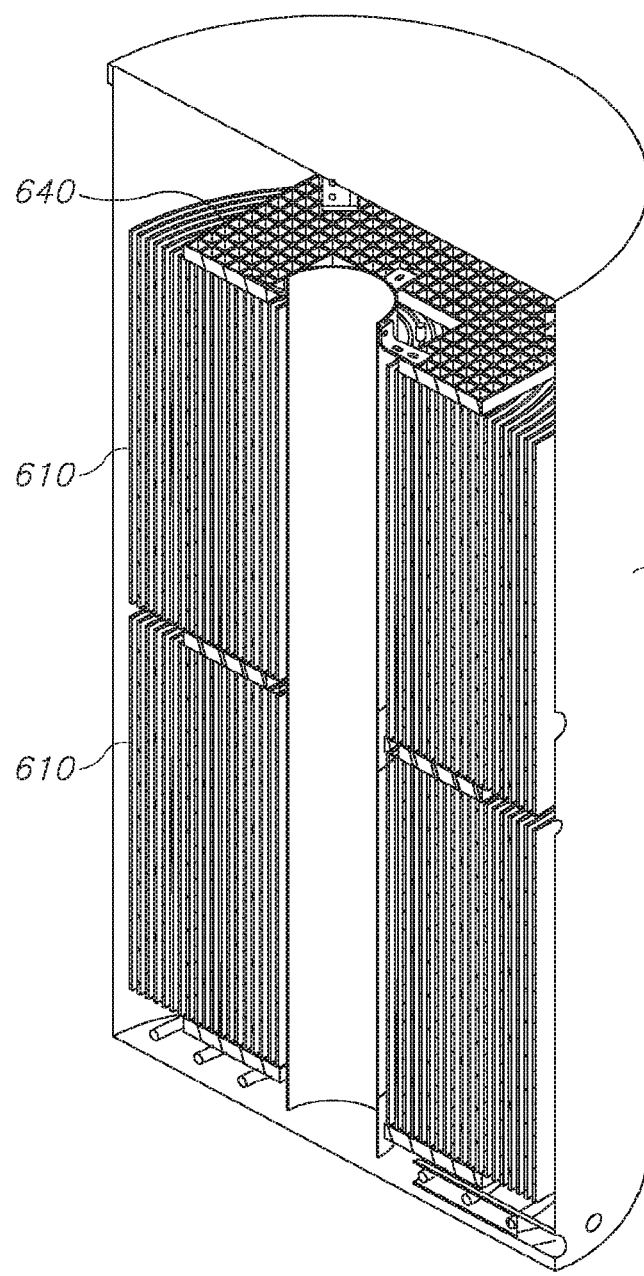
FIGS. 8A-8C are, respectively, a perspective cross-section (FIG. 8A) of a tank with a module of this disclosure, an exploded view (FIG. 8B) of such a tank and a water treatment system with a plurality of such tank (FIG. 8C).
Figure 8B:
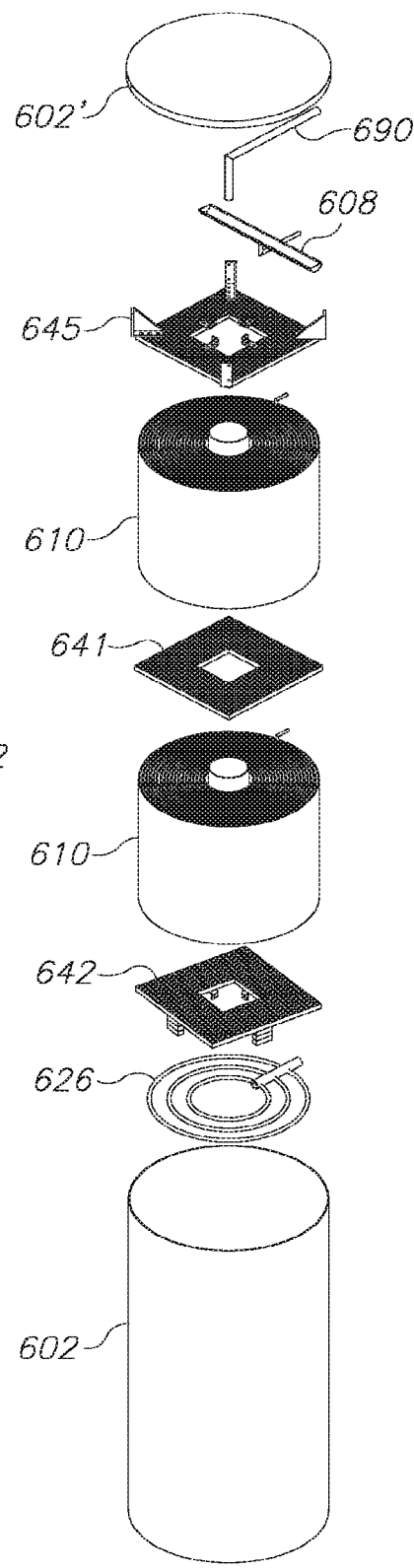
Figure 8C:
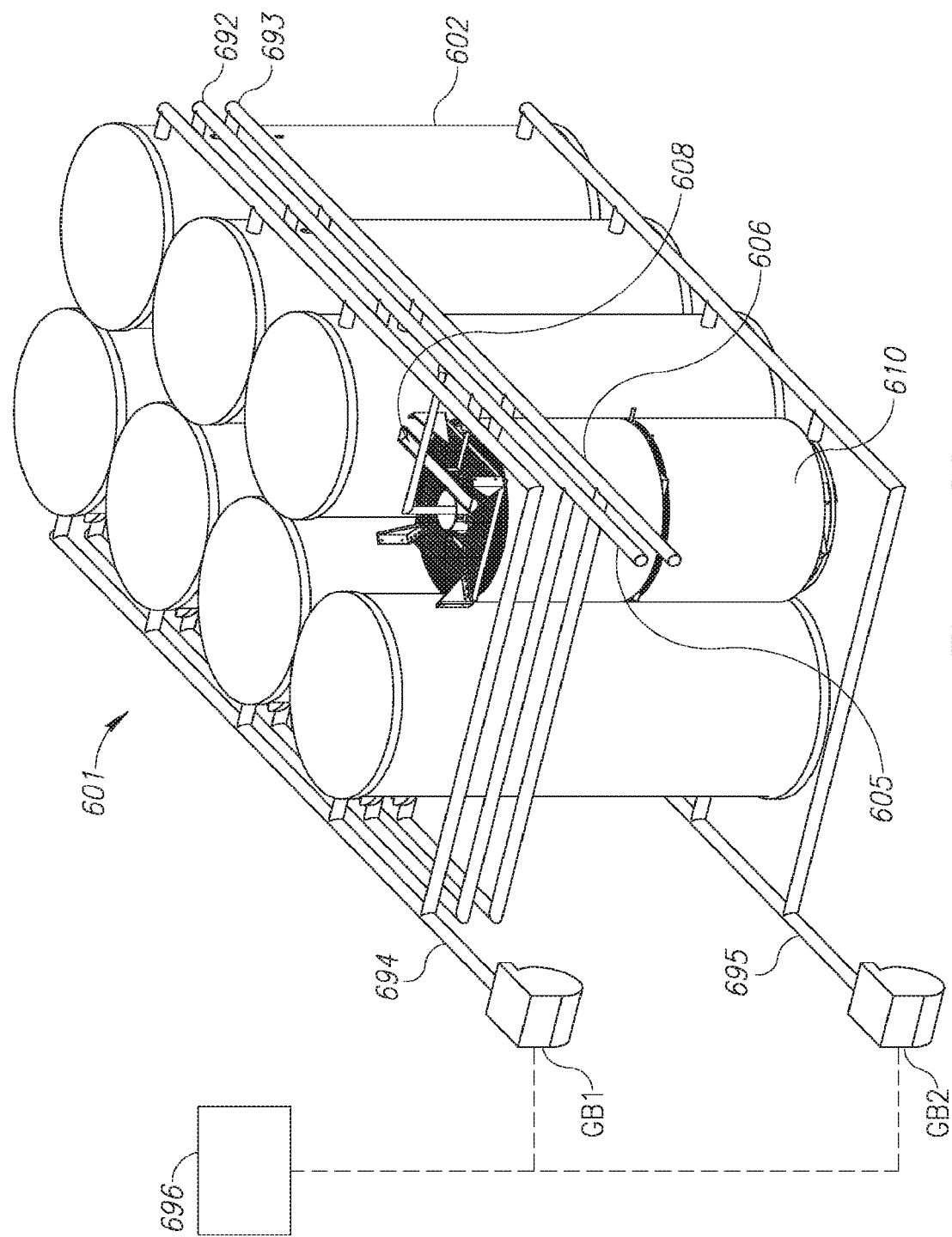

FIGS. 8A-8B are schematic illustration of a bioreactor and FIG. 8C is a schematic illustration of an array of bioreactors as described herein within a system comprising a plurality of bioreactors of a type illustrated in FIGS. 8A and 8B the array of bioreactors being in flow communication by the aid of interconnecting pipes.

Specifically, as can be seen in FIGS. 8A and 8B module 600, which is a stack of two wound enclosure assemblies 610 stacked on top of the other, with a top support element 640, bottom support element 642 and intermediate support element 641 as well as a diffuser arrangement 626.

Each module 600 is enclosed within a respective tank 602 including a tank cover 602' that is configured to hold water to be treated and module 600 submerged in the water. Top support element is attached to tank 602 and tank cover 602' via attachment elements 645. Tank 602 comprises water inlet 605 and treated water outlet 606.

In some embodiments, as also illustrated in FIGS. 8A-8C, each tank 602 is further equipped with a water collecting weir 608, located at a top portion of tank 602 and configured to collect treated clarify from a top level of the water within tank 602. In some embodiments, weir 608 has a shape of a perforated trough allowing only water to enter into the weir. Operationally, tank 602 holds biomass and discharges the treated and clarified water through overflow of the clarified water into weir 608 at operational periods when diffuser arrangement is inactive (i.e. in between mixing events) and biomass is allowed to at least partially settle in tank 602. Water in weir 608 is directed to treated water outlet at the bottom of the weir. Periodically, typically also between mixing events by the diffuser arrangement, settled biomass can be discharged from tank 602 via biomass discharge outlet (not shown). The discharged biomass can then be recirculated into the bioreactor or to a different bioreactor or collected for future use.

The present disclosure also provides a bioreactor for water treatment comprising a water treatment space and an integrally formed weir (chamber) at a top portion of said water treatment space, said weir configured to receive clarified treated water and to discharge said clarified treated water from the bioreactor. In some embodiments, the integrally formed weir is operable to discharge the clarified treated water when water in the water treatment space is at rest (i.e. essentially no mixing or turbulence in the water).

A bioreactor as disclosed herein can also or as an alternative to weir 608 be equipped with a solid-liquid separation tank (e.g. clarifier) for receiving discharged treated water that includes suspended solids and for removing solids from said treated water. Specifically, and as also illustrated in FIG. 12B treated water having therein suspended solids are discharged (via treated water discharge outlet) into a dedicated water solid separation unit ("clarifier"). The collected biomass can be recirculated into a bioreactor or collected for future use while the treated and clarified water is collected.

Furthermore, a bioreactor as disclosed herein can comprise one or more sensors for sensing one or more treatment parameters indicative of the quality of water within said tank. The sensors can be of any type known or needed to be used in water quality monitoring and assurance. These include any one and any combination of pH sensors, oxidation-reduction potential (ORP) sensors, dissolved oxygen sensors, optical-density sensors (turbidity sensors), chemical sensors (e.g. to determine level of N-containing compounds including nitrate or ammonium) and potentiometric sensors etc. Typically but not exclusively or mandatory the sensors would be located at a point of exit of the treated water so as to monitor quality of the treated water. In one embodiment the monitored parameter is used in controlling operation of one or more elements of the bioreactor. In some embodiments, based on data received from one or more sensors the operation of the diffuser arrangement can be manipulated. For example, mixing frequency and/or mixing duration caused by the diffuser arrangement can be increased as a response to any indication for decline in effluent quality.

Further, the bioreactor can comprise a plurality of modules. In one embodiment, two modules are staked one on top of the other in a manner similar to that illustrated in FIGS. 8A-8B.

In some embodiments, multiple treatment tanks, each containing one or more modules, e.g. of a type illustrated in any of FIGS. 1 to 3 or 8A and 8B are arranged to be connected in series to form an upstream array of treatment tanks and a downstream array of treatment tanks, wherein the modules in each array are all connected in parallel. Water to be treated first enters and is treated by the upstream array of modules after which it is communicated to the downstream array of modules.

The bioreactor disclosed herein can also be part of a water treatment system 601 (water treatment plant) such as that schematically illustrated in FIG. 8C (parts of the cover of one bioreactor has been removed to show internal elements) that includes a multiplicity of bioreactors 602 of the kind illustrated in FIGS. 8A-8B. Feed water conduit 692 supplies water to be treated to each of the bioreactors and treated water is discharged via water discharge conduit 693. Gas, e.g. air, to the gas enclosures is supplied via a first gas conduit 694, and the diffuser arrangements receive gas, typically air, via second gas conduit 695, both gas conduits are fed with the respective gas using blower GB1 and blower GB2. The system's operation is controlled by a control module 696.

Figure 9A:
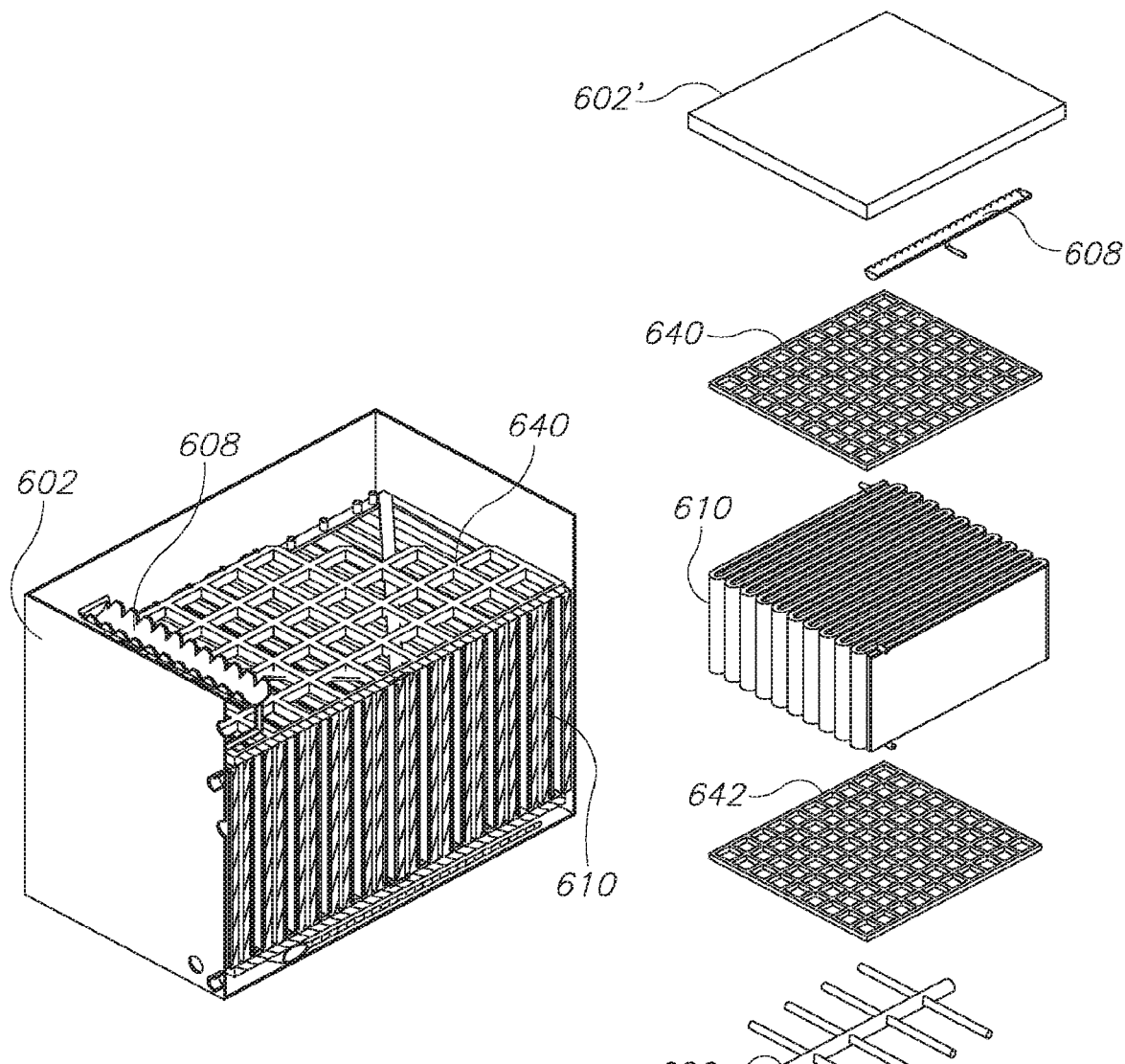
FIGS. 9A-9C are, respectively, a perspective cross-section (FIG. 9A) of a tank with a module according to another embodiment of this disclosure, an exploded view (FIG. 9B) of such a tank and a water treatment system with a plurality of such tanks (FIG. 9C).
Figure 9B:
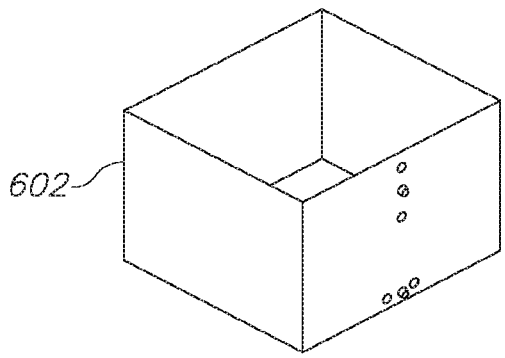
Figure 9C:
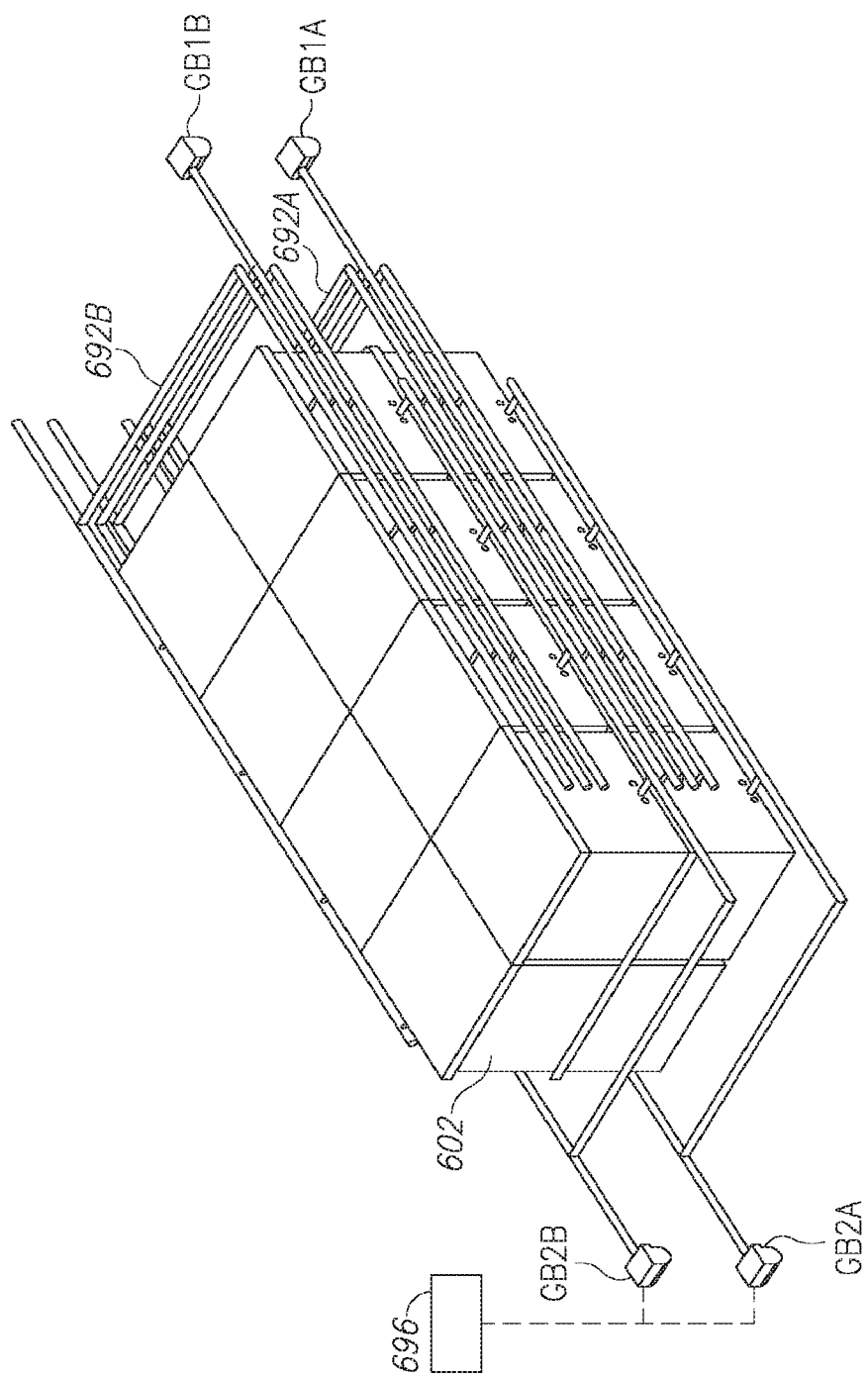

FIGS. 9A-9C illustrate a system of another embodiment making use, as can be seen in FIGS. 9A-9B, of water treatment modules of the kind shown in FIGS. 7A-7B and like elements to those used in FIGS. 7A-7B are used for like elements. The system itself, illustrated in FIG. 9C includes a top series of bioreactors stacked over a bottom series of bioreactors, but otherwise it is functionally similar to the system of FIGS. 8A-8C other than the fact that the conduits systems are doubles, one for each bioreactors series. Accordingly, like reference numerals to those used in FIG. 8C are used for functionally equivalent elements of the conduit system with an "A" for the bottom elements and "B" for the top elements (e.g. water conduits 692A and 692B)

Figure 10A:
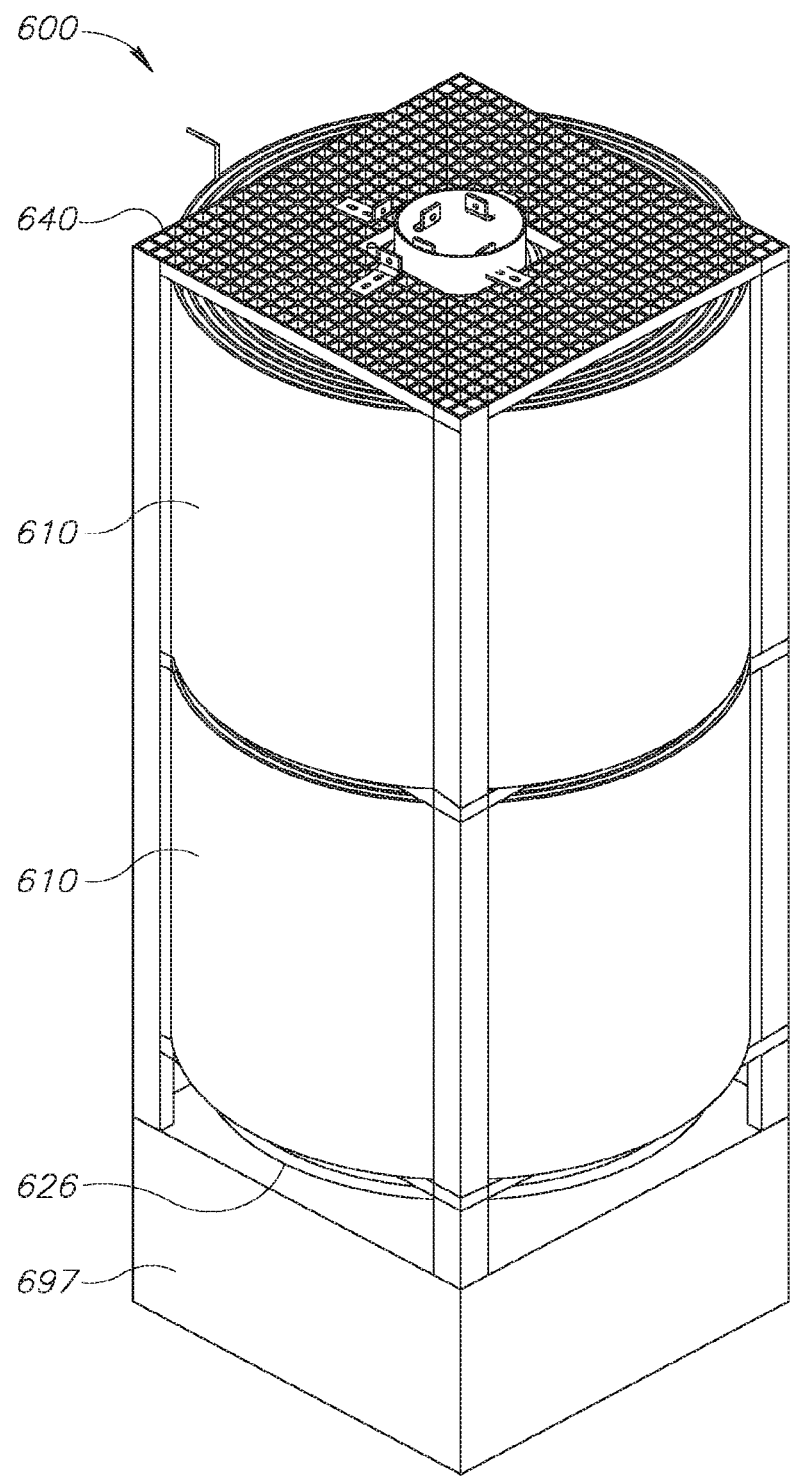
FIGS. 10A-10B are, respectively, a stacked module held in a reinforcing structure (FIG. 10A) according to an embodiment of this disclosure and a system with a plurality of such modules (FIG. 10B).
Figure 10B:
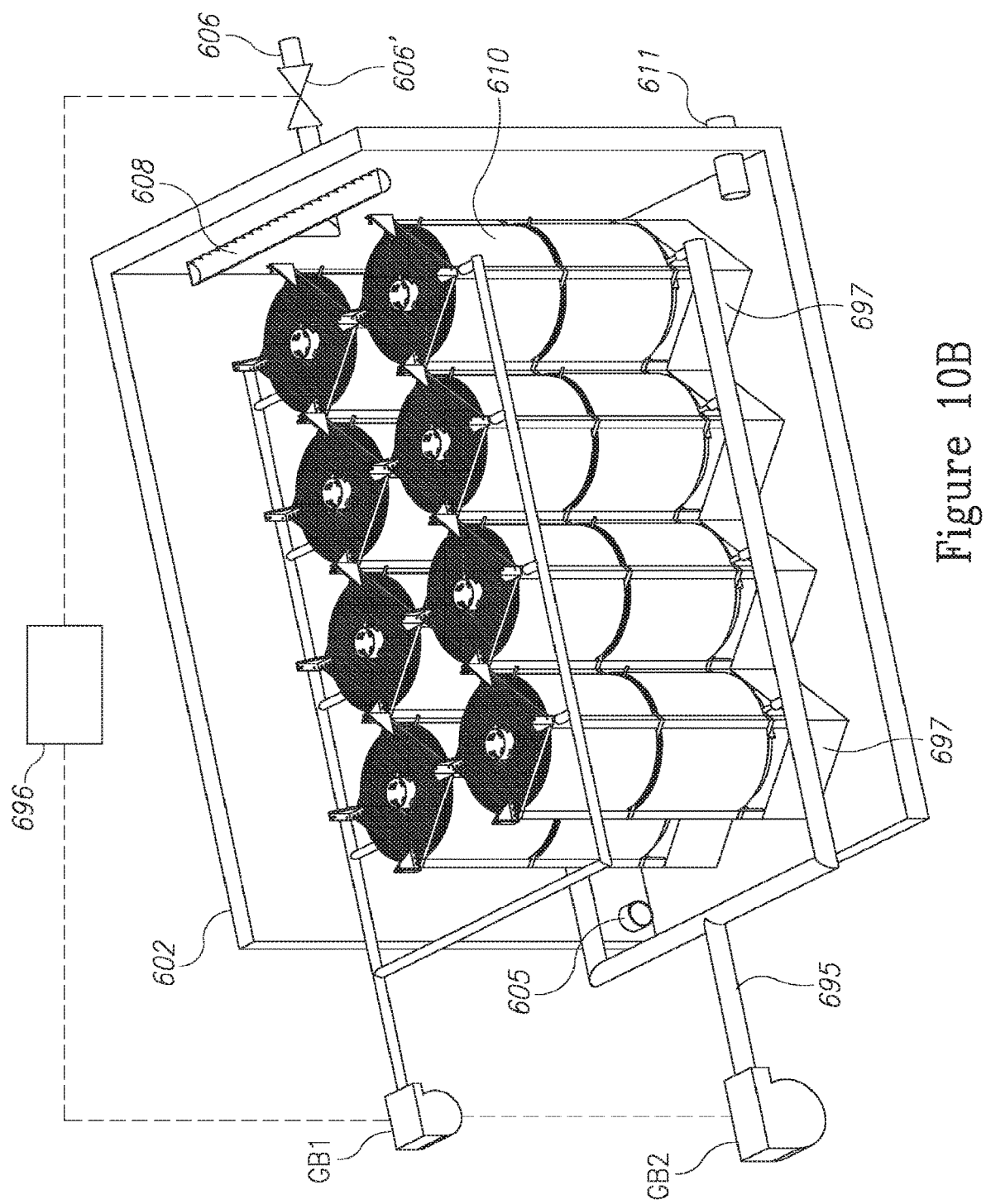

In an alternative embodiment, a system in accordance with the present disclosure can comprise a plurality of modules submerged together within a single tank as shown in the exemplary illustration of FIGS. 10A and 10B. For simplicity, like reference numerals to those used in FIGS. 8A and 8B, are used to identify components having a similar function.

FIG. 10A schematically illustrates another embodiment of a submersible single module 600 comprising two gas enclosures 610 in an arrangement similar to that illustrated in FIG. 8A. The elements of module 600 assembled with a stabilizing element 697 also connected to support elements 640 and 642 (not seen in FIG. 10A). Stabilizing element 697 is typically constructed to retain the submerged modules in place and provide them with sufficient weight so as to stabilize the entire structure within the water environment. Alternatively the submersible modules can be mechanically attached to the floor of the tank by mechanical means such as screw anchors, hooks, hangers and bolts.

FIG. 10B schematically illustrates a section of an embodiment of a multiplicity of modules of FIG. 10A submerged inside a mutual tank 602. Also illustrated in FIG. 10B are feed water inlet 605, settled sludge discharge outlet 611, treated water outlet 606, via weir 608, the discharge of treated water being controlled by discharge valve 606', the valve being in a closed configuration during operation of the diffuser arrangement.

Figure 11A:
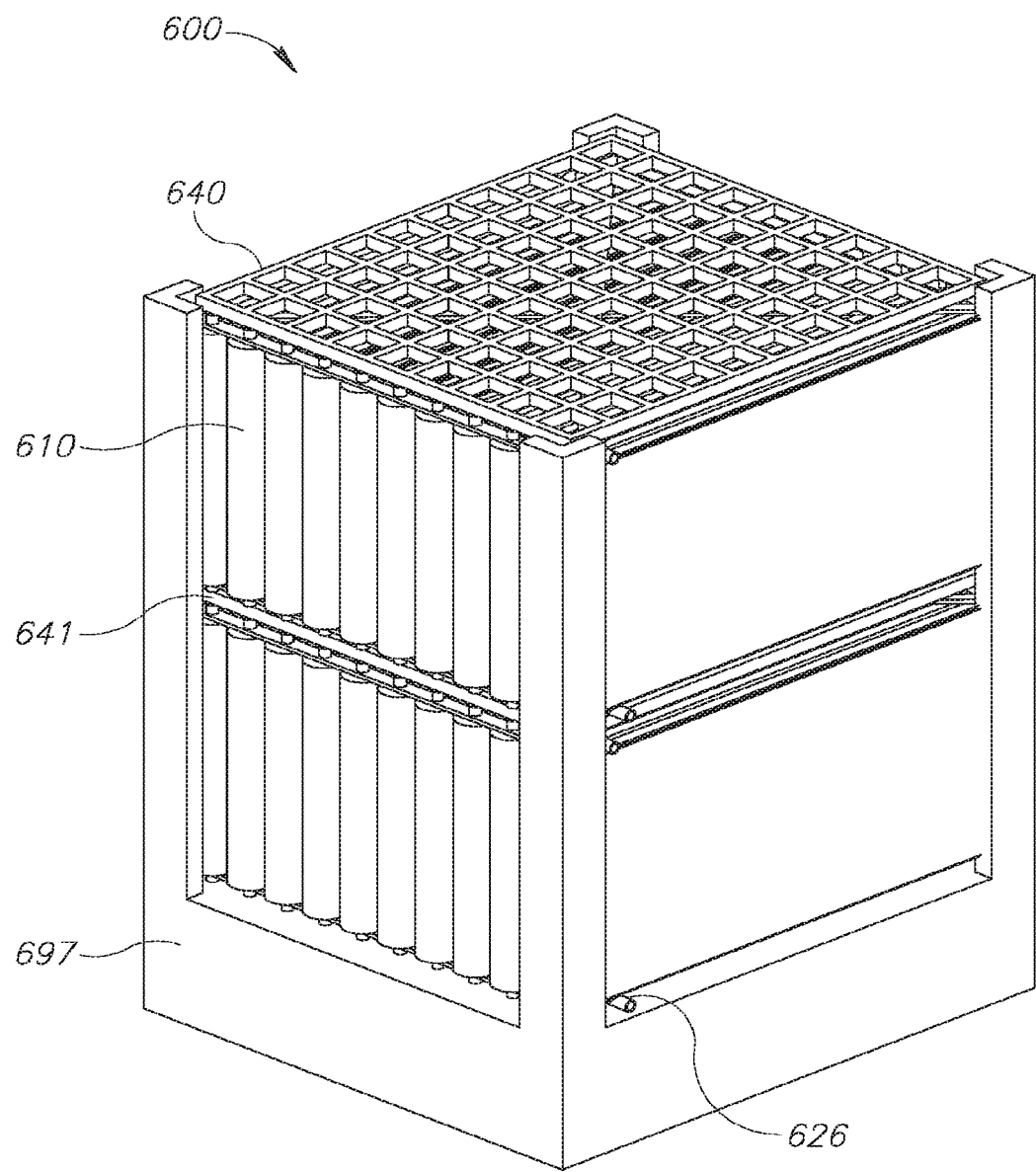
FIGS. 11A-11B are, respectively, a stacked module held in a reinforcing structure (FIG. 11A) according to another embodiment of this disclosure and a system with a plurality of such modules (FIG. 11B).
Figure 11B:
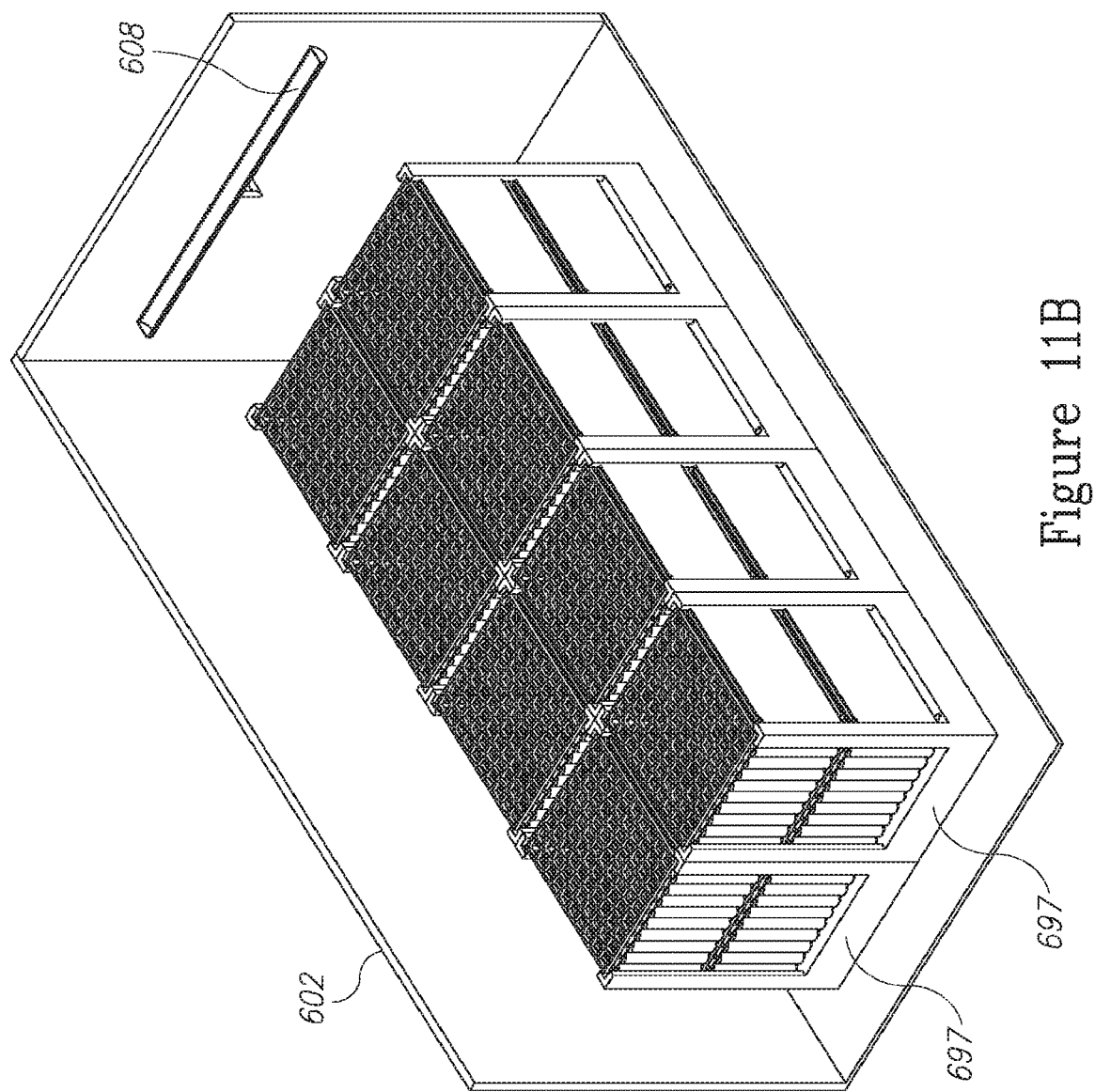

FIGS. 11A and 11B provide a module (FIG. 11A) and system (FIG. 11B) similar to that illustrated in FIGS. 10A and 10B, respectively, albeit of a kind illustrated in FIGS. 7A-7B. The set of modules are placed in a single tank 602, each being maintained in place with the aid of stabilizing element 697.

As can be appreciated by those versed in the art, the module, bioreactor and/or system disclosed herein can be constructed and operated to treat water in combination with other types of modules, bioreactors and/or systems. In some embodiments, a system comprising a plurality of modules or bioreactors as disclosed herein can be used to provide a first stage or as a subsequent treatment stage of water in combination with one or more other types of water treatment modules. In other words the systems of the present invention can be installed upstream and/or downstream of other water treatment systems as part of a complete water treatment plant. Without being limited thereto, module, bioreactor and/or system as disclosed herein can be operated in combination with a system as disclosed in PCT Publication No. WO/11073977 the content of which is incorporated herein by reference. Generally, WO/11073977 describes a system with a spirally rolled enclosure, similar to the gas enclosure disclosed herein, that is intended to hold and channel the water and support biofilm growth within it.

The module, bioreactor and/or system disclosed herein can be configured to treat various types of water using respectively different types of gases. In the following, when referring to a system it is to be understood as similarly referring to module or a bioreactor mutatis mutandis. Some exemplary methods of water treatment making use of a system disclosed herein are described with reference to the flow charts illustrated in FIGS. 12A-12C and FIGS. 13A-13C hereinbelow. For simplicity, same reference numbers are used in FIGS. 12A-12C and FIGS. 13A-13C to represent identical elements.

Generally, the system is configured to perform water treatment by performing the following general method steps:
  introducing gas into the gas enclosure;
  introducing water to be treated into a bioreactor;
  operating the diffuser arrangement (continuously or periodically or upon need) to introduce gas streams into the water held within the bioreactor;
  collecting treated water.

In some embodiments, the gas introduced into gas enclosure is air. In some other embodiments, the gas introduced into the gas enclosure is air enriched with oxygen, another oxygen-containing gas mixture or methane or a methane-containing gas mixture.

In some embodiments, the system is operated in a batch mode, namely, a batch of water is introduced into the bioreactor(s) and treated water is collected once the water has reached the desired quality (the desired quality being dependent on the particular need of the water and is typically a priori determined on a case by case basis). When operating in a batch mode once the treated water reaches a pre-defined quality criteria, the treated water is collected, typically via a treated water outlet. A pre-defined quality criteria can vary, depending on the type of water, the defined use of the treated water (e.g. for drinking, for irrigation, for industry, etc), the stage of treatment, e.g. when the system is part of a water treatment plant including a combination of water treatment systems, etc.

In some other embodiments, the system is operated in a continuous mode where water is continuously introduced into a bioreactor from one location and is discharged from another location of the bioreactor(s).

In yet some other embodiments, the system is operated such that water to be treated is fed in an essentially continuous mode while treated water is periodically discharged.

The discharge of treated water is halted during operation of the diffuser arrangement and thereby mixing of the water within the tank is halted as well.

In some embodiments, the gas arrangement is operated periodically. As an example, the diffuser arrangement can be operated regularly 10-20 seconds every 5-20 minutes. In addition or alternatively, the diffuser arrangement can be operated upon need, e.g. to allows scouring excess accumulation of biofilm on the membrane or to improve treated water quality when such accumulation or water quality deterioration is detected (e.g. using dedicated sensors such as ORP or DO) and/or when there is a need to cause turbulence in the water undergoing treatment and thereby mixing of suspended solids. In some other embodiments, the diffuser arrangement is operated continuously.

Figure 12A:
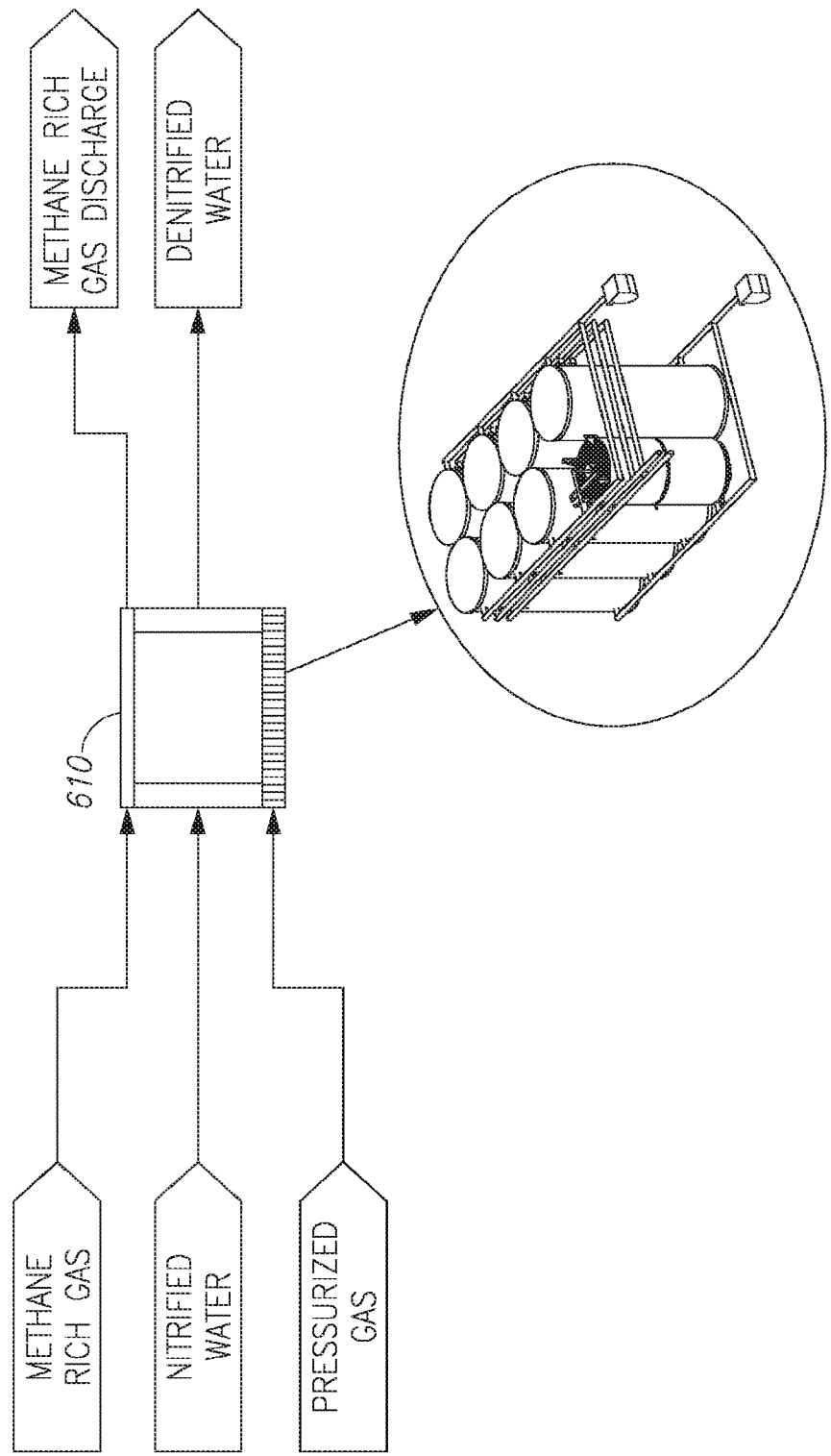
FIGS. 12A-12C are process flow diagrams for de-nitrification of water in accordance with some embodiments of this disclosure.
Figure 12B:
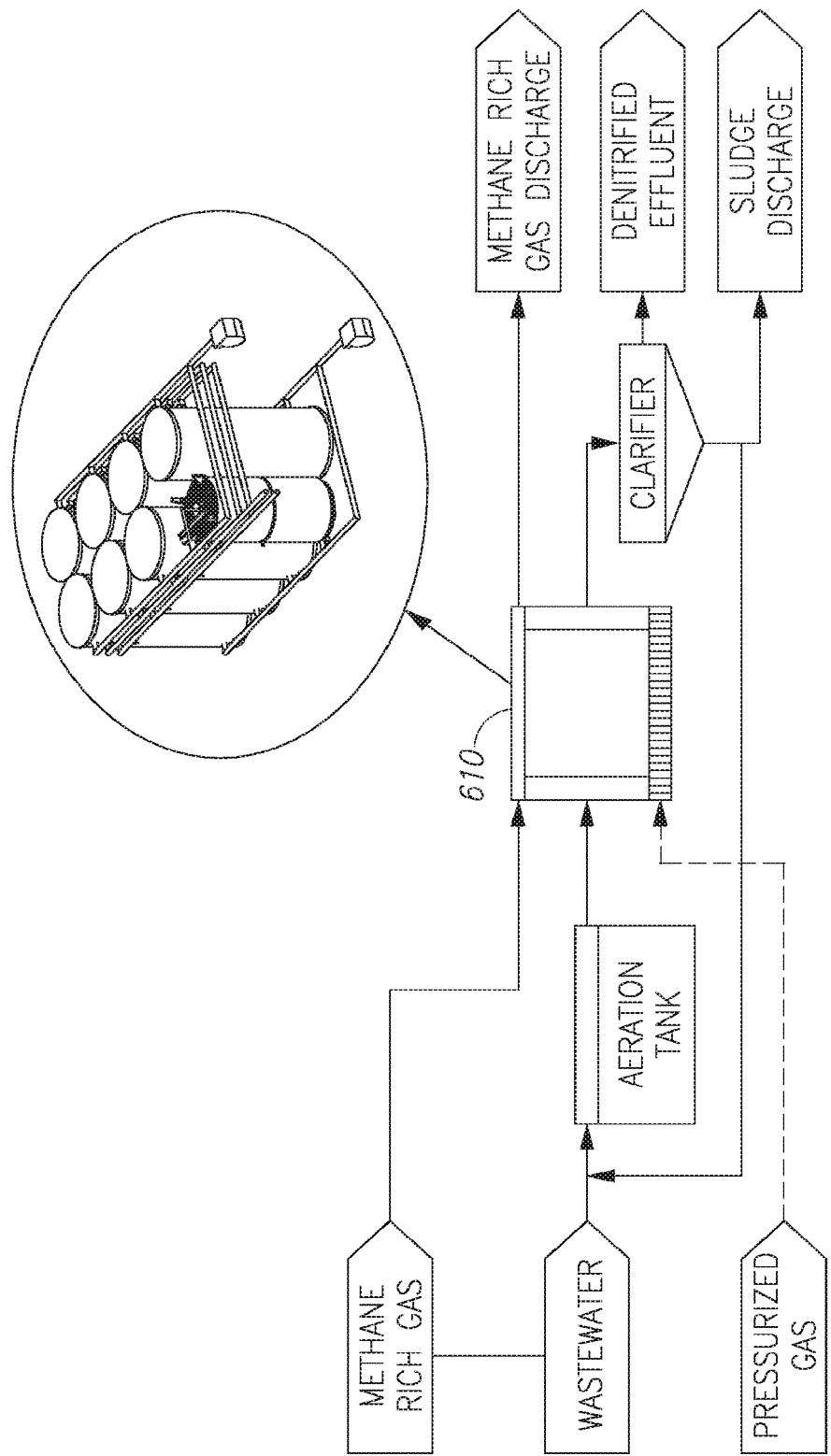
Figure 12C:
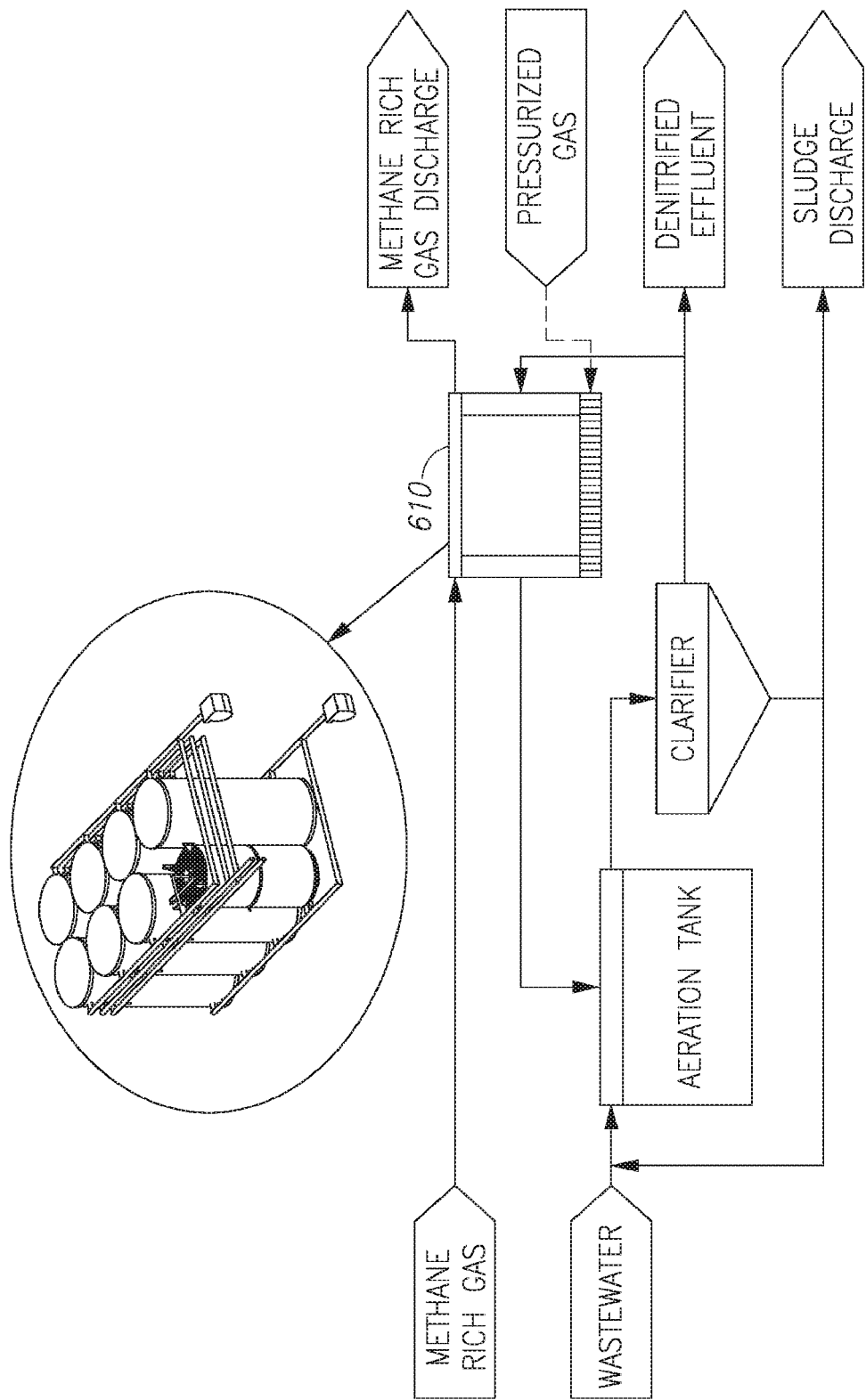

Turning now to non-limiting examples of using a bioreactor according to some embodiments of the present disclosure, FIGS. 12A-12C each schematically illustrate process flow diagram explaining sequential steps for treating nitrified water using methane as an electron donor gas (denitrification gas) within the gas enclosure, in accordance with one embodiment of the present disclosure. In the context of the present disclosure when referring to "nitrified water" it is to be understood as nitrogen-containing water and specifically to water containing dissolved nitrogen oxide compounds, most specifically nitrate and nitrite). In some embodiments, nitrified water is also characterized by low organic matter concentration.

Nitrified water can be coupled to anoxic oxidation of methane to thereby produce carbon dioxide, Nitrogen gas and water according to the following series of chemical reactions:

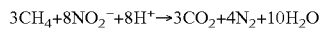

To this end, methane gas is fed into the gas enclosure

The methane containing gas can be obtained from various sources. In some examples, the methane containing gas is a biogas derived from anaerobic reactors e.g. from an anaerobic digestor employed in biological wastewater (sewage) treatment facilities.

In accordance with one embodiment illustrated in FIG. 12A, a bioreactor 610 of a kind illustrated herein receives nitrified water. A methane-containing gas ("Methane rich biogas") is continuously blown within the gas enclosures, and methane depleted gas is discharged from the gas enclosure's outlet.

Mixing is performed periodically by pressurized air being introduced through diffuser arrangement and is ejected into the water treatment spaces between the walls of the spirally rolled gas enclosure, also providing scouring of biofilm from the water facing sides of the gas enclosure. A biofilm that develops on the outer surface of the vertical walls of the gas enclosure and is operative to oxidize methane gas that diffuses through the membrane using the nitrogen oxides in the water, thus, reducing nitrogen oxides in the water (denitrifying the water).

In accordance with yet another embodiment being illustrated in FIG. 12B, a bioreactor 610 operated in a manner similar to that described with respect to FIG. 12A, is configured to receive nitrified water from an Aeration Tank. Wastewater including suspended solids, organic material and ammonia, is first fed into the Aeration Tank where (i) organic material is oxidized by the aid of the aerated air within the Aeration Tank (ii) ammonia is oxidized to nitrate to thereby provide nitrified water that enters, along with its sludge, into bioreactor 610, where nitrified water undergoes denitrification. Also illustrated in FIG. 12B is a Clarifier downstream to bioreactor 610 constructed and operated to receive treated water and where solids in the treated water are allowed to settle at the bottom of the Clarifier and only then the solid free treated water ("denitrified effluent") is collected in a treated (denitrified) water collector (e.g. tank, pipeline etc.). At least part of the sludge collected at the Clarifier is communicated to a sludge discharge unit.

Solid settling devices (clarifiers) are known in the art and at times include a conically shaped basin with a sludge discharge at the bottom thereof, while water is discharged (overflows) from an outlet located (at a top location) above the sludge discharge.

Treated water exiting bioreactor 610 is received by a Clarifier for subsequent solid-liquid separation in the clarifier. At times, part of the sludge from Clarifier is communicated (circulated or recirculated) into a Aeration Tank where it is mixed with water to be treated as described above. Notably, the return sludge from Clarifier is active biomass that treats the water in Aeration Tank. Then it is separated from the water in the clarifier in order to discharge clear water and in order to retain the active solids in the system.

Considering the above, the present disclosure also provides a water treatment method comprising (i) submerging within nitrified water an elongated enclosure comprising a wall separating from an internal elongated path within said enclosure and nitrified water treatment space external to said elongated enclosure, the wall comprising a water impermeable, methane permeable membrane; and (ii) flowing within said internal elongated path methane gas.

In some embodiments, the methane gas diffuses to the nitrified water treatment space to participate in redox reaction of nitrogen oxide species in the nitrified water.

In some embodiments, the methane gas is a biogas derived from anaerobic reactors.

FIG. 12C provides a schematic process flow diagram illustrating sequential steps making use of a system of a kind illustrated in FIG. 8C for treating wastewater similar to that exemplified in FIG. 12B. In this embodiment, water discharged from bioreactor 610, containing dissolved organic materials being produced as a result of biofilm oxidation of methane gas also introduced into the bioreactor is fed into an Aeration Tank to enrich the water to be treated with a carbon source that supports and promote denitrification in the Aeration Tank. Denitrified water including suspended solids is then subjected to solids removal in a Clarifier from which solids are removed either to a sludge discharge unit or are returned to Aeration Tank. Treated (clarified) water is discharged to Denitified Effluent outlet with, at times, at least a portion thereof being communicated/circulated to bioreactor 610, for a further use. Water from which solids have been removed is either introduced into bioreactor 610 or is collected as denitrified effluent. At times, water exiting bioreactor 610 can be re-communicated to Aeration Tank.

At times, and while not illustrated, commercially available methanol, acetate or other sources of biodegradable organic matter can be used to facilitate the anoxic denitrification process. Further, at times, gas containing methane can be received as biogas from an anaerobic reactor, e.g. from a sludge digester, treating excess sludge from a biological wastewater treatment process.

The above operational configurations overcome problems of insufficient resources (electron donors) for denitrification to the levels required by regulations. A common solution for such lack of resources is purchasing methanol or a acetate or a different soluble biodegradable organic material, to be fed to an anoxic denitrification part of the biological treatment process. The process illustrated in FIG. 12A-12C allow a more efficient denitirification process due to the continuous supply of the required electron donor species.

It follows from the above that the present disclosure also provides methods for producing organic compound containing solution. The method comprises (i) submerging within water an elongated enclosure comprising a wall separating from an internal elongated path within said enclosure and water treatment space external to said elongated enclosure, the wall comprising a water impermeable, methane permeable membrane; and (ii) flowing within said internal elongated path methane gas; (iii) communicating treated water to an activated sludge tank whereby organic compound containing solution is produced.

In some embodiments, the method comprises discharging air (or any other gas including at least oxygen containing species) into said water treatment space. The biofilm oxidizes the methane in the presence of the oxygen containing species introduced into the water and produces inter alia, organic compounds in solution. The organic compounds can be, for example, methanol, acetate, butyrate, etc. This solution can then be used as electron donor solution in denitrification processes, such as those described herein. In some embodiments, the methane gas is a biogas derived from anaerobic reactors.

Figure 13:
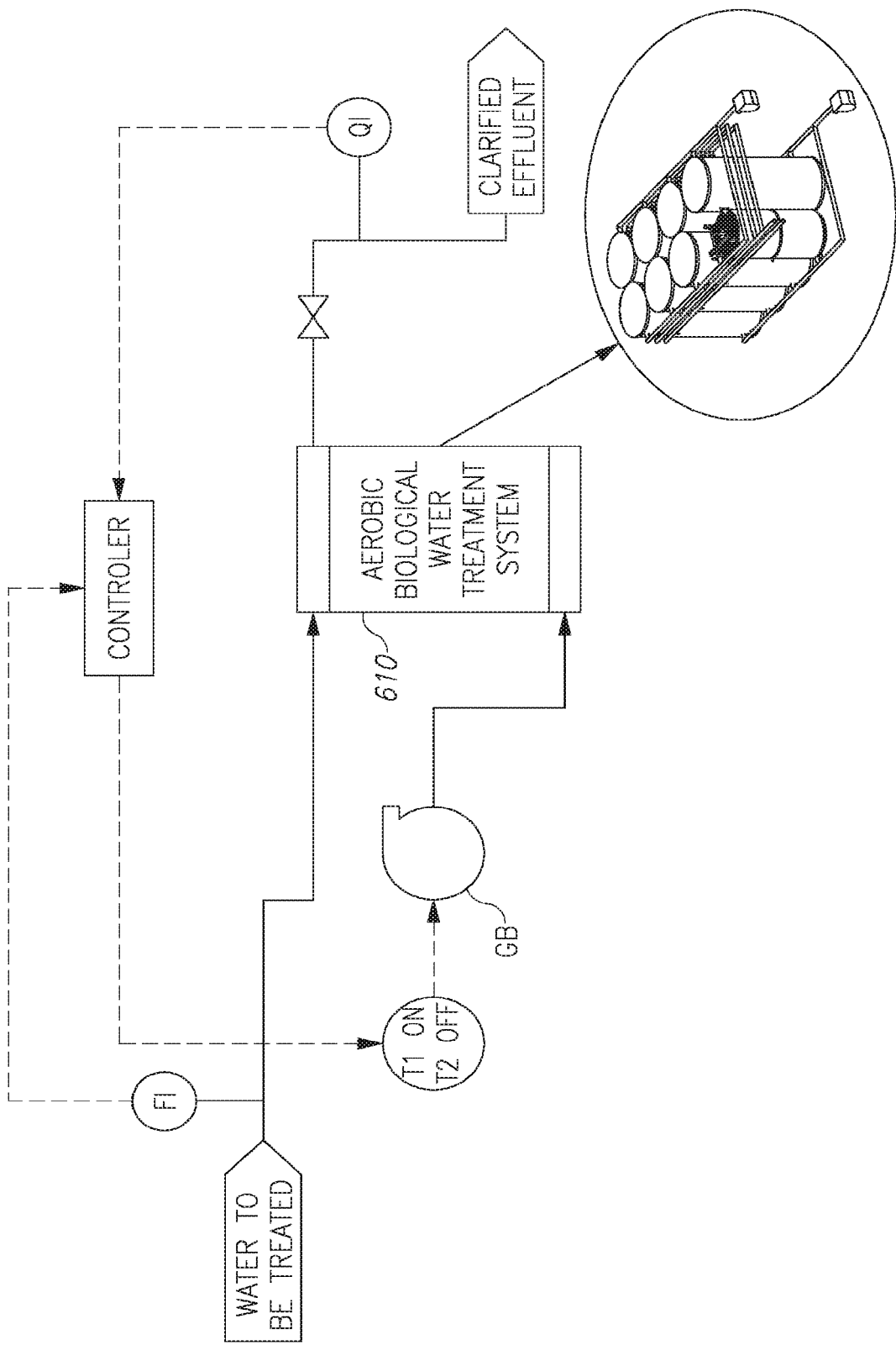
FIG. 13 is a process flow diagram for aerobic biological treatment of water in accordance with some embodiments of this disclosure.

Turning now to FIG. 13 there is provide a process flow diagram illustrating the operational steps for aerobic treating water in accordance with yet one other embodiment of the present disclosure and making use of bioreactor 610 of a kind illustrated in FIG. 8C. In this example, particularly illustrated are monitoring and controlling elements. Water to be treated is introduced into bioreactor 610 with the gas enclosure being fed with oxygen containing gas using blower GB. The operation of blower GB is controlled by Controller controlling the duration at which blower GB is active (T1) or closed (T2) and accordingly gas is diffused into bioreactor 610 via its diffuser arrangement (not illustrated) The time periods T1 and T2 are determined to provide, inter alia, a balance between mixing of suspended matter in the water, sufficient/effective scouring of the enclosure's walls and sludge settling in the bioreactor. As appreciated, T1 and T2 can be adapted during operation of the system, according to need, and this adaptation can be controlled by Controller.

FIG. 13 also illustrated a flow indicator "FT" module allowing the monitoring of water flow from a water source to the system, and a quality indicator "QI" module including one or more sensors for sensing quality of the treated water existing bioreactor 610. The sensors can provide Controller data including parameters indicative of any of ammonium ion concentration, COD concentration, oxidation reduction positional (ORP), turbidity, etc. as described above. Controller receives the data and is configured to at least cause a change in any of T1 and T2, e.g. by increasing T1 and/or decreasing T2 in response to any indication for decline in effluent quality.

Further illustrated in FIG. 13 is a valve that can be in an open or closed configuration as dictated by Controller and in some embodiments is closed when blower GB is activate Finally, it follows the above that the present disclosure also provides a method for determining aeration schedule of water during water treatment, the method comprises receiving data relating to quality of the water and modifying gas diffusing/discharging schedule according to said data. In some embodiments, said data is received from a quality indicator of a kind described herein. In some embodiments, the aeration schedule comprises duration of aerations from gas diffusing arrangement of a kind described herein,

The invention claimed is:

1. A method for treating water, the method comprises:
   introducing water into a bioreactor comprising at least one gas permeable, water impermeable membrane module, defining at least one gas enclosure and one or more water treatment spaces;
   introducing a water-treatment gas into the at least one gas enclosure;
   introducing gas into a gas diffuser arrangement positioned underneath the gas permeable, water impermeable membrane module, to thereby cause the discharge of a stream of gas into the one or more water treatment; and
   collecting treated water;
   wherein the gas is intermittently introduced through the diffuser arrangement into the one or more water treatment spaces and wherein any one of duration and frequency of the gas being introduced is determined by at least one parameter indicative of quality of water within the bioreactor,
   wherein the introducing of gas and discharge of a stream of gas causes mixing of the water, and
   wherein the at least one parameter is concentration of ammonium-containing compounds within the water, and
   wherein any one of said frequency and duration are increased in response to an increase of said concentration of ammonium-containing compounds.

2. The method of claim 1, wherein the any of duration and frequency of the gas being introduced is manipulated by a controller according to any of the at least one parameter indicative of quality of water.

* * * * *